(12) United States Patent
Fujiwara

(10) Patent No.: US 7,421,434 B2
(45) Date of Patent: Sep. 2, 2008

(54) APPARATUS AND METHOD FOR MUSICAL TUNE PLAYBACK CONTROL ON DIGITAL AUDIO MEDIA

(75) Inventor: Yuji Fujiwara, Hamamatsu (JP)

(73) Assignee: Yamaha Corporation, Shizuoka-Ken (JP)

( * ) Notice: Subject to any disclaimer, the term of this patent is extended or adjusted under 35 U.S.C. 154(b) by 917 days.

(21) Appl. No.: 10/385,394

(22) Filed: Mar. 10, 2003

(65) Prior Publication Data

US 2004/0032680 A1    Feb. 19, 2004

(30) Foreign Application Priority Data

Mar. 12, 2002    (JP) ............................. 2002-067623

(51) Int. Cl.
*G06F 17/30* (2006.01)
*G06F 7/00* (2006.01)

(52) U.S. Cl. ................... 707/10; 707/101; 707/102; 707/104.1; 360/15; 360/18; 84/609; 84/622

(58) Field of Classification Search ............... 707/101, 707/102, 104.1, 10; 386/94, 95, 96, 98, 105, 386/125; 360/15; 369/85, 153.05; 455/567, 455/556.1, 550, 550.1; 84/600, 609, 477 R, 84/470 R See application file for complete search history.

(56) References Cited

U.S. PATENT DOCUMENTS

| | | | | |
|---|---|---|---|---|
| 4,681,007 A | * | 7/1987 | Nikaido et al. ............... | 84/626 |
| 4,779,252 A | * | 10/1988 | Custers et al. ............ | 369/30.27 |
| 5,157,643 A | * | 10/1992 | Suzuki ..................... | 369/30.3 |
| 5,537,387 A | * | 7/1996 | Ando et al. ............... | 369/275.1 |
| 5,753,844 A | * | 5/1998 | Matsumoto ................. | 84/609 |

(Continued)

FOREIGN PATENT DOCUMENTS

JP    08-315548    11/1996

(Continued)

OTHER PUBLICATIONS

"Architecture and Implementation of a single-chip programmable digiatl televison media processor"—Dutta, S. Singh, D. and Mehra, V.—Signal Processing Systems, 1999, SIPS 99 IEEE Oct. 20-22, 1999 (pp. 321-330).*

(Continued)

*Primary Examiner*—Jean Fleurantin
*Assistant Examiner*—Anh Ly
(74) *Attorney, Agent, or Firm*—Harness, Dickey & Pierce, PLC

(57) ABSTRACT

A musical tune playback control apparatus adapted to a music playback apparatus performs prescribed musical tune playback controls on a digital audio medium (or a digital storage medium, e.g., a CD and a MD) in association with a storage device such as a hard disk drive. Musical tune data recorded on digital audio media satisfying prescribed conditions are automatically selected and are transferred to the storage device, thus allowing the user to easily create a musical tune collection or an album collection suiting the user's preferences. Prescribed conditions are described in such a way that musical tune data are reproduced over a prescribed time or more, or musical tune data are repeatedly reproduced a prescribed number of times or more, for example. Thus, it is possible to reduce a user's burden to perform troublesome operations in selecting musical tune data suiting the user's preferences.

20 Claims, 13 Drawing Sheets

U.S. PATENT DOCUMENTS

| | | | |
|---|---|---|---|
| 5,847,306 A * | 12/1998 | Wakuda | 84/649 |
| 5,986,979 A * | 11/1999 | Bickford et al. | 369/30.09 |
| 6,061,496 A * | 5/2000 | Nakamura et al. | 386/98 |
| 6,243,725 B1 * | 6/2001 | Hempleman et al. | 715/530 |
| 6,355,870 B1 * | 3/2002 | Tsai et al. | 84/605 |
| 6,501,967 B1 * | 12/2002 | Makela et al. | 455/567 |
| 6,549,767 B1 * | 4/2003 | Kawashima | 455/412.2 |
| 6,727,417 B2 * | 4/2004 | Oren-Chazon | 84/470 R |
| 6,782,192 B1 * | 8/2004 | Tanaka et al. | 386/125 |
| 7,099,704 B2 * | 8/2006 | Taniguchi et al. | 455/567 |
| 7,167,635 B1 * | 1/2007 | Ando et al. | 386/96 |
| 2001/0026287 A1 * | 10/2001 | Watanabe | 345/764 |
| 2002/0027838 A1 * | 3/2002 | Kato et al. | 369/30.05 |
| 2002/0161798 A1 * | 10/2002 | Kanda et al. | 707/501.1 |
| 2003/0013432 A1 * | 1/2003 | Fukaya | 455/412 |
| 2003/0159564 A1 * | 8/2003 | Oren-Chazon | 84/477 R |
| 2003/0175014 A1 * | 9/2003 | Mori et al. | 386/94 |
| 2003/0176206 A1 * | 9/2003 | Taniguchi et al. | 455/567 |
| 2003/0225582 A1 * | 12/2003 | Fujiwara et al. | 704/270 |
| 2004/0014484 A1 * | 1/2004 | Kawashima | 455/550.1 |
| 2004/0252976 A1 * | 12/2004 | Tanaka et al. | 386/95 |
| 2006/0239149 A1 * | 10/2006 | Mori et al. | 369/47.28 |
| 2006/0239647 A1 * | 10/2006 | Mori et al. | 386/95 |
| 2007/0005454 A1 * | 1/2007 | Yodo | 705/27 |

FOREIGN PATENT DOCUMENTS

| | | |
|---|---|---|
| JP | 2000-099048 | 4/2000 |
| JP | 2000251382 A | 9/2000 |
| JP | 2001-273747 | 10/2001 |

OTHER PUBLICATIONS

"Hierarchical filtering method for content-based music retrieval via acoustic input"—Jyh-Shing, Roger Jang, and Hong-Ru Lee—International Multimedia Conference; vol. 9, Proceedings of the 89th ACM (pp. 401-410).*

Japanese Office Action dated Apr. 18, 2006 Issued on Japanese Patent Application No. 2002-67623.

Japanese Office Action dated Feb. 5, 2008 for counterpart Japanese Patent Application No. 2007-145551.

* cited by examiner

| INDEX DATA (DISK ID, MUSICAL TUNE NUMBER) | PLAYBACK HISTORY DATA (PLAYBACK TIMES, TOTAL PLAYBACK TIME) | MUSICAL TUNE DATA |

| INDEX DATA (DISK ID) | MUSICAL TUNE NUMBER | MUSICAL TUNE NUMBER | MUSICAL TUNE NUMBER |
|---|---|---|---|
| | MUSICAL TUNE DATA | MUSICAL TUNE DATA | MUSICAL TUNE DATA |

FIG. 11

| DISK ID | MUSICAL TUNE NUMBER | PLAYBACK TIMES | TOTAL PLAYBACK TIME |
|---|---|---|---|
| Disk[A] | | | |
| | Music001 | 5 | 18:26 |
| | Music003 | 6 | 28:15 |
| | Music008 | 6 | 23:30 |
| | ⋮ | ⋮ | ⋮ |
| Disk[B] | | | |
| | Music001 | 4 | 15:16 |
| | Music003 | 4 | 20:32 |
| | Music009 | 5 | 15:58 |
| | ⋮ | ⋮ | ⋮ |

| DISK ID | MUSICAL TUNE NUMBER | PLAYBACK TIMES | TOTAL PLAYBACK TIME |
|---|---|---|---|
| Disk[A] | Music006 | 6 | 28:15 |
| Disk[A] | Music008 | 6 | 23:30 |
| Disk[B] | Music003 | 4 | 20:32 |
| Disk[A] | Music001 | 5 | 18:26 |
| Disk[B] | Music009 | 5 | 15:58 |
| Disk[B] | Music001 | 4 | 15:16 |
| ⋮ | ⋮ | ⋮ | ⋮ |

| DISK ID | MUSICAL TUNE NUMBER |
|---|---|
| Disk[A] | |
| | Music001 |
| | Music002 |
| | Music003 |
| | ⋮ |
| Disk[B] | |
| | Music001 |
| | Music002 |
| | Music003 |
| | ⋮ |

| DISK ID | MUSICAL TUNE NUMBER | PLAYBACK TIMES | TOTAL PLAYBACK TIME | |
|---|---|---|---|---|
| Disk[A] | | | | |
| | Music001 | 5 | 18:26 | L3 |
| | *Music002* | 0 | 0:00 | |
| | Music003 | 6 | 28:15 | |
| | *Music004* | 0 | 0:00 | |
| | *Music005* | 0 | 0:00 | |
| | ⋮ | ⋮ | ⋮ | |
| Disk[B] | | | | |
| | Music001 | 4 | 15:16 | |
| | *Music002* | 0 | 0:00 | |
| | Music003 | 4 | 20:32 | |
| | *Music004* | 0 | 0:00 | |
| | ⋮ | ⋮ | ⋮ | |

FIG. 16

| INDEX DATA (DISK ID, MUSICAL TUNE NUMBER) | PLAYBACK HISTORY DATA (PLAYBACK START TIME) | MUSICAL TUNE DATA |
|---|---|---|

| DISK ID | MUSICAL TUNE NUMBER | PLAYBACK DATE | PLAYBACK TIME |
|---|---|---|---|
| Disk[A] | Music001 | 7/21 | 10:43 |
| Disk[A] | Music002 | 7/21 | 10:52 |
| Disk[B] | Music005 | 8/1 | 19:04 |
| Disk[C] | Music012 | 8/15 | 8:59 |
| ⋮ | ⋮ | ⋮ | ⋮ |

FIG. 20

| USER ID | DISK ID | MUSICAL TUNE NUMBER | PLAYBACK TIMES | TOTAL PLAYBACK TIME |
|---|---|---|---|---|
| ID01 | Disk[A] | Music001 | 5 | 18:26 |
| | | ... | ... | ... |
| | Disk[B] | Music002 | 4 | 15:16 |
| | | ... | ... | ... |
| ID02 | Disk[B] | Music003 | 4 | 20:32 |
| | | ... | ... | ... |
| | Disk[D] | Music002 | 6 | 30:15 |
| | | ... | ... | ... |

APPARATUS AND METHOD FOR MUSICAL TUNE PLAYBACK CONTROL ON DIGITAL AUDIO MEDIA

BACKGROUND OF THE INVENTION

1. Field of the Invention

This invention relates to apparatuses and methods (e.g., software programs) for musical tune playback controls on musical tune data recorded on digital audio media such as compact disks (CDs) and mini disks (MDs) in association with storage devices (e.g., hard disks). In addition, this invention also relates to digital audio media that store musical tune data to suit prescribed rules regarding musical tune playback controls.

2. Description of the Related Art

Conventionally, music playback apparatuses such as digital audio players allow users to selectively play back (or "reproduce") desired musical tunes from among musical tunes stored in digital audio media (or digital storage media) such as CDs and MDs as well as DVDs (i.e., digital versatile disks). Generally, these apparatuses have various manipulators (e.g., switches and controls) allowing users to select desired musical tunes to be played back (or "reproduced").

In the aforementioned apparatuses, however, it is necessary for users to select desired musical tunes each time when installing digital audio media therein. This may be very troublesome for users, particularly, inexperienced users, to select desired musical tunes with respect to each of digital audio media. For this reason, even though conventional apparatuses have pre-installed functions allowing users to arbitrarily select musical tunes from among musical tunes stored in digital audio media, users tend not to use these functions because of the difficulties in handling them. Recently, audio playback apparatuses are designed to have multiple functions so that the numbers of manipulators (e.g., switches and controls) are correspondingly increased; therefore, engineers must solve the aforementioned problem regarding users' difficulties in using tune selecting functions in audio playback apparatuses.

SUMMARY OF THE INVENTION

It is an object of the invention to provide an apparatus and a method for musical tune playback control, in which a user of an audio playback apparatus can easily select a desired musical tune to be played back without experiencing a burden in operation.

A musical tune playback control apparatus of this invention is adapted to a music playback apparatus to perform prescribed musical tune playback controls on a digital audio medium (or a digital storage medium, e.g., a CD and a MD) in association with a storage device such as a hard disk drive. That is, musical tune data recorded on digital audio media satisfying prescribed conditions are automatically selected and are transferred to the storage device, thus allowing the user to easily create a musical tune collection or an album collection suiting user's preference. Prescribed conditions are described in such a way that musical tune data are reproduced over a prescribed time or more, or musical tune data are repeatedly reproduced a prescribed number of times or more, or the number of musical tune data that are reproduced in the past in an album becomes equal to a prescribed number or more. Thus, it is possible to reduce the user's burden in performing troublesome operation in selecting musical tune data suiting the user's preference.

In addition, the music playback apparatus displays a musical tune collection list and/or an album list created by the user on the screen, so that the user can easily select and reproduce desired musical tune data, which are produced by a speaker and the like by way of an audio system and the like.

BRIEF DESCRIPTION OF THE DRAWINGS

These and other objects, aspects, and embodiments of the present invention will be described in more detail with reference to the following drawings, in which:

FIG. 11 shows an example of a musical tune collection list displayed on the screen of the display;

FIG. 12 shows an example of a musical tune collection list in which musical tune data are rearranged in response to total playback times;

FIG. 13 shows an example of an album collection list displayed on the screen of the display;

FIG. 15 shows an example of a musical tune collection list displayed on the screen of the display in accordance with the second embodiment of the invention;

FIG. 16 shows an example of a formation according to which musical tune data and related data are stored in the hard disk drive in accordance with a third embodiment of the invention;

FIG. 20 shows an example of a musical tune collection list whose content is modified.

DESCRIPTION OF THE PREFERRED EMBODIMENTS

This invention will be described in further detail by way of examples with reference to the accompanying drawings.

1. First Embodiment

Figures 1, 2, 3:
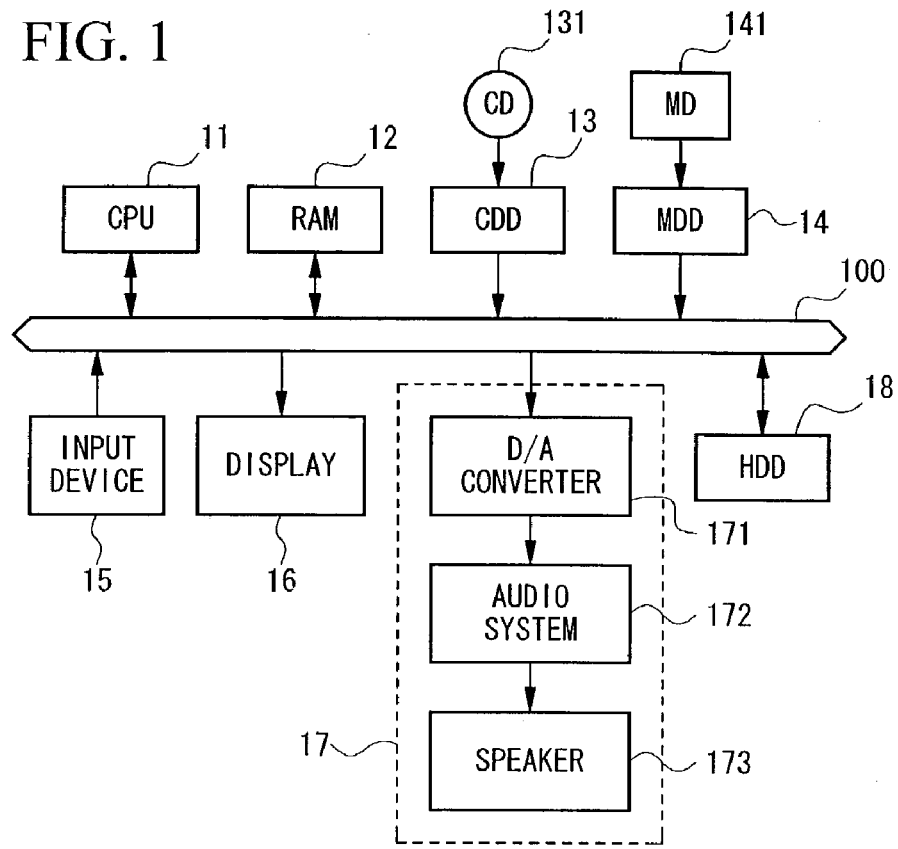
FIG. 1 is a block diagram showing the overall configuration of a music playback apparatus incorporating a musical tune playback control apparatus in accordance with a preferred embodiment of the invention.
FIG. 2 shows a string of data that are stored in a hard disk drive in a musical tune collection creation mode.
FIG. 3 shows a string of data that are stored in the hard disk drive in an album collection creation mode.

FIG. 1 shows the overall configuration of a music playback apparatus to which a musical tune playback control apparatus is adapted in accordance with the preferred embodiment of the invention. The music playback apparatus of FIG. 1 comprises a central processing unit (CPU) 11, a random-access memory (RAM) 12, a compact disk drive (CDD) 13, a mini disk drive (MDD) 14, an input device 15, a display 16, a sound reproduction unit 17, and a hard disk drive (HDD) 18, all of which are mutually interconnected via a bus 100.

The CPU 11 executes programs stored in the HDD 18 or a read-only memory (ROM, not shown), thus controlling several blocks interconnected via the bus 100 in FIG. 1. The RAM 12 is a semiconductor memory that is used as a main memory for the CPU 11.

The CD drive 13 reads data stored in a compact disk (CD) 131 installed therein. The MD drive 14 reads data stored in a mini disk (MD) 141 installed therein. Both the CD 131 and the MD 141 store musical tune data, each of which correspond to digital data representing musical tone waveforms contained in a single musical tune. The present embodiment is described in a precondition that each of the CD 131 and the MD 141 stores a prescribed number of musical tune data corresponding to plural musical tunes pre-recorded therein. Incidentally, these disks can be referred to as digital audio media (or digital storage media), for example. In addition, a set of musical tune data stored in a single digital audio medium is referred to as an album.

The input device 15 comprises a pointing device such as a mouse and a keyboard for inputting characters and symbols. Upon operation of the input device 15, a signal representing a position of a pointer, a character, a numeral, or a symbol is correspondingly supplied to the CPU 11. Therefore, the user of the music playback apparatus of FIG. 1 can instruct the CPU 11 to reproduce desired musical tune data recorded on the CD 131 or MD 141 upon operation of the input device 15. The display 16 can be constituted as a cathode-ray tube (CRT) or a liquid crystal display (LCD), which displays images on the screen thereof.

The sound reproduction unit 17 produces musical tones based on musical tune data that are supplied thereto upon operation of the input device 15. Specifically, it comprises a digital-to-analog (D/A) converter 171, an audio system 172, and a speaker (or speakers) 173. Herein, the D/A converter 171 converts digital musical tune data to analog musical tone signals. The audio system 172 comprises an effector for imparting prescribed sound effects such as reverberation effects to musical tones, and an amplifier for amplifying musical tone signals output from the D/A converter 171. The speaker 173 produces musical tones corresponding to musical tone signals output from the audio system 172. The music playback apparatus of FIG. 1 does not necessarily incorporate the speaker 173, which can be replaced with an earphone set or a headphone set that can be applied to ears of a user, for example.

The hard disk drive (HDD) 18 stores operating systems (OS) and application programs as well as various kinds of data used in execution of programs. In the present embodiment, the HDD 18 stores musical tune playback control programs including commands and instructions regarding playback controls of musical tunes as application programs. In addition, the HDD 18 has storage areas for storing musical tune data of the CD 131 or the MD 141 transferred thereto. The music playback apparatus of the present embodiment can be set to various operation modes, depending on which different sets of musical tune data are to be transferred to the HDD 18.

That is, the music playback apparatus of FIG. 1 provides a musical tune collection creation mode and an album collection creation mode, either one of which can be arbitrarily selected by the user. Details of these modes will be described below.

(A) Musical Tune Collection Creation Mode

The musical tune collection creation mode allows the user to create a desired collection of musical tunes upon automatic determination of the user's preference regarding musical tunes. In this mode, the user's preferred musical tune data suiting prescribed conditions are selected from among musical tune data recorded on the CD 131 or the MD 141 and are automatically transferred to the hard disk drive 18. The present embodiment provides four conditions depending on numbers of playback times of musical tunes in advance; therefore, the user can select one of these conditions, which will be described below:

(1) First condition Ca1: at least a part of the presently selected musical tune data are reproduced.

(2) Second condition Ca2: the presently selected musical tune data are reproduced over one minute or more.

(3) Third condition Ca3: the presently selected musical tune data are reproduced over two minutes or more.

(4) Fourth condition Ca4: the presently selected musical tune data are completely reproduced from the beginning to the end.

In the initial state, the third condition Ca3 is set to the music playback apparatus of FIG. 1 in advance.

Specifically, the CPU 11 automatically determines musical tune data, which are reproduced over the prescribed time designated by the preset condition or more within plural musical tune data recorded on the CD 131 or the MD 141, as representation of a musical tune suiting user's preference, so that the musical tune data are stored in the hard disk drive 18. At this time, the musical tune data satisfying the preset condition are stored together with index data and playback history data as shown in FIG. 2. Herein, the index data are used to specify the musical tune data and comprise an identifier (referred to as a disk ID), which is directly assigned to a digital audio medium storing the musical tune data, and other information (e.g., a musical tune number) that shows a serial number of the musical tune data within the plural musical tune data counted in the digital audio medium. That is, the index data is specified based on specific information called "TOC" (namely, Table Of Contents) prerecorded on the digital audio medium. The playback history data represent contents of playback in the past with respect to the musical tune data and comprise a number of times by which the musical tune data are repeatedly reproduced in the past, and an accumulated time (referred to as a total playback time) in which the musical tune data are reproduced in the past. As described above, in the musical tune collection creation mode, musical tune data accompanied with index data and playback history data are stored in the hard disk drive 18 with respect to each of musical tune data satisfying the preset condition, so that a collection of musical tune data suiting the user's preference is to be created.

(B) Album Collection Creation Mode

The album collection creation mode allows the user to create a desired collection of albums upon automatic determination of the user's preference regarding albums (each of which is stored in a single digital audio medium, e.g., the CD 131 or the MD 141), so that the corresponding musical tune data are collectively stored in the hard disk drive 18 in units of albums. In this mode, contents of a specific album suiting a prescribed condition (i.e., all musical tune data recorded on the corresponding digital audio medium) are automatically stored in the hard disk drive 18. The present embodiment provides three conditions, each of which describes a specific number of musical tune data actually reproduced within all musical tune data constructing an album; therefore, the user can select one of these conditions, which will be described below.

(1) First condition Cb1: two or more musical tune data in an album are reproduced.
(2) Second condition Cb2: five or more musical tune data in an album are reproduced.
(3) Third condition Cb3: all musical tune data in an album are reproduced.

In the initial state, the second condition Cb2 is set to the music playback apparatus of FIG. 1 in advance.

Specifically, the CPU 11 automatically determines a specific album, in which the number of musical tune data actually reproduced becomes equal to the aforementioned number designated by the preset condition or more, as an album suiting user's preference, which is then stored in the hard disk drive 18. At this time, the hard disk drive 18 stores index data of a digital audio medium corresponding to the album together with all musical tune data, each of which is accompanied with a musical tune number as shown in FIG. 3. Herein, the index data contain a disk ID that is directly assigned to the digital audio medium of the album. In the album collection creation mode, all musical tune data accompanied with index data and musical tune numbers are stored in the hard disk drive 18 with respect to each of albums satisfying the preset condition, so that a collection of albums suiting user's preference is to be created.

Next, the overall operation of the music playback apparatus of FIG. 1 will be described in accordance with the present embodiment. First, when the user operates the input device 15 to start a musical tune playback control program, the CPU 11 reads the musical tune playback control program from the hard disk drive 18 and transfers it to the RAM 12 prior to execution. The overall operation of the musical tune playback control program is divided into two types of sequence controls, namely, a first sequence control for creation of a collection of musical tunes or a collection of albums by use of musical tune data recorded on digital audio media (see FIGS. 4 to 9) and a second sequence control for utilization of the created collection of musical tunes or the created collection of albums (see FIGS. 10 to 13), which will be described in turn.

Figure 4:
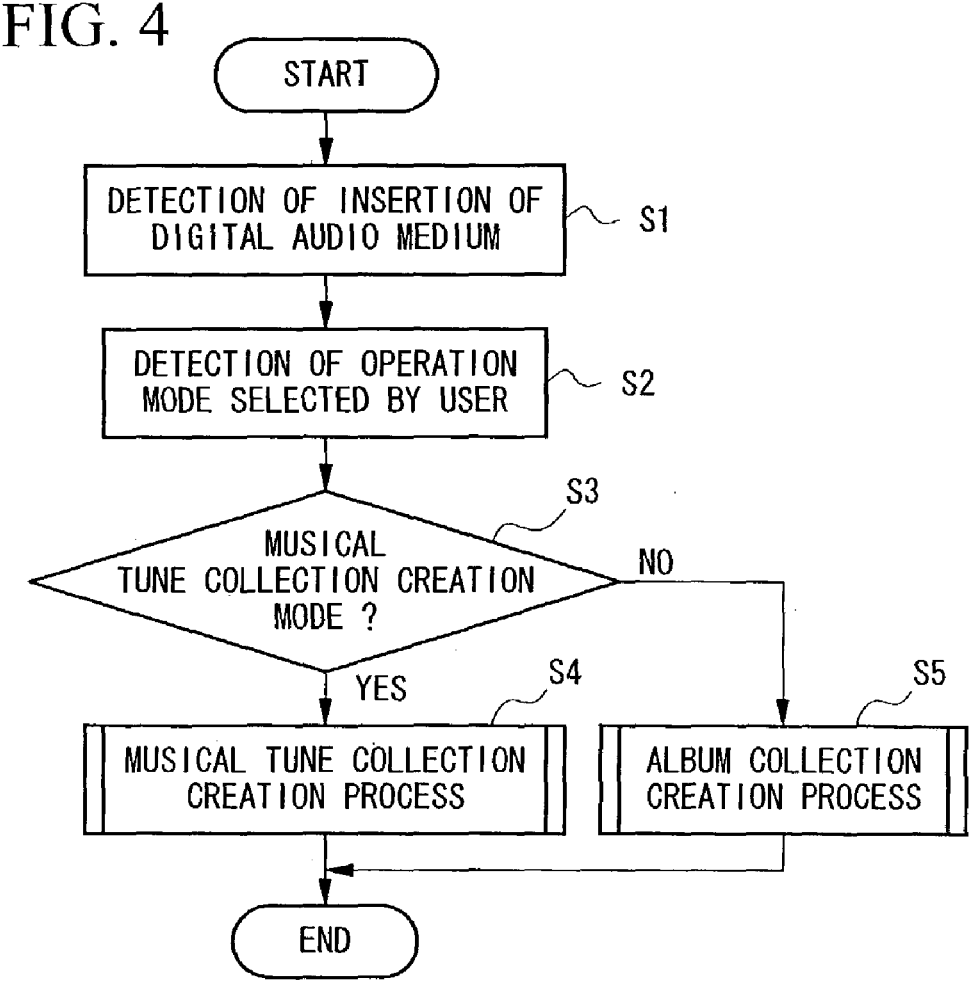
FIG. 4 is a flowchart showing a main routine of processing executed by the music playback apparatus of FIG. 1.

(A) First Sequence Control for Creation of a Collection of Musical Tunes or a Collection of Albums When the user operates the input device 15 to designate the first sequence control, the CPU 11 executes the corresponding program to create a collection of musical tunes or a collection of albums by use of musical tune data recorded on the CD 131 or the MD 141. FIG. 4 is a flowchart showing a main routine in this first sequence control, which is described in such a way that the CD 131 is used as a playback material. Of course, it is possible to use the MD 141 as a playback material.

Figure 5:
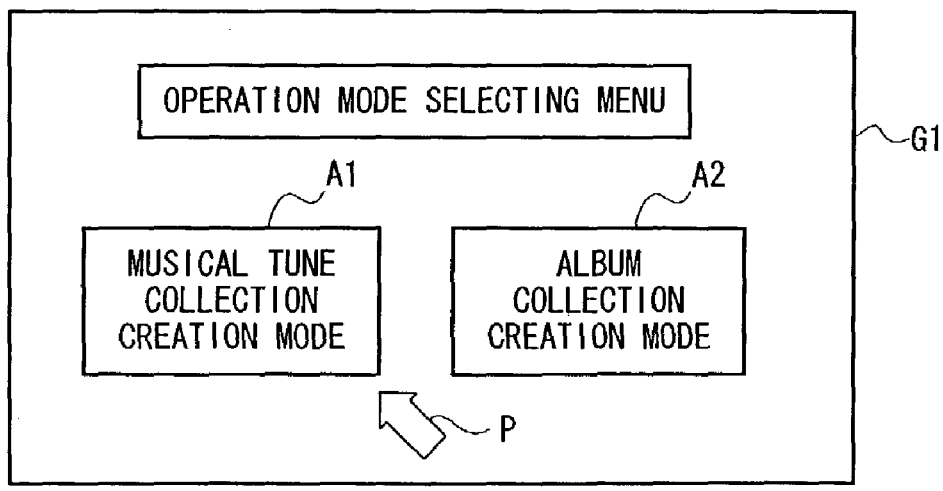
FIG. 5 shows an example of an operation mode selecting menu that is displayed on the screen of a display.

When the user installs the CD 131 in the CD drive 13, the CD drive 13 in turn outputs a signal representing an insertion (or installation) of the CD 131 to the CPU 11. Upon detection of this signal (see step S1 in FIG. 4), the CPU 11 performs processing allowing the user to arbitrarily select a desired operation mode in step S2. That is, the CPU 11 controls the display 16 to display a prescribed image (referred to as an operation mode selecting menu) G1 on the screen, allowing the user to arbitrarily select either a musical tune collection creation mode or an album collection creation mode. An example of the operation mode selecting image G1 is shown in FIG. 5, wherein a title of "OPERATION MODE SELECTING MENU" is displayed together with two regions for user's selection, namely, a region A1 entitled "MUSICAL TUNE COLLECTION CREATION MODE" and a region A2 entitled "ALBUM COLLECTION CREATION MODE". That is, the user firstly operates a pointing device (e.g., a mouse) of the input device 15 to move a pointer (or a cursor) P to match the aforementioned region A1 or A2; and then, the user designates one of the aforementioned modes by clicking a mouse button, for example. Thus, the user can select either the musical tune collection creation mode or the album collection creation mode on the screen of the display 16, which shows the operation mode selecting menu G1.

In step S3 shown in FIG. 4, the CPU 11 makes a decision as to whether or not the musical tune collection creation mode is selected by the user. When the CPU 11 determines that the user presently selects the musical tune collection creation mode, the flow proceeds to step S4 to perform a musical tune collection creation process. In contrast, when the CPU 11 determines that the operation mode presently selected by the user does not match the musical tune collection creation mode, in other words, when the user presently selects the album collection creation mode, the flow proceeds to step S5 to perform an album collection creation process. When either the musical tune collection creation process or the album collection creation process is completed, the CPU 11 ends the main routine shown in FIG. 4.

Next, details of the musical tune collection creation process of the aforementioned step S4 will be described with reference to the flowchart of FIG. 6.

Figure 7:
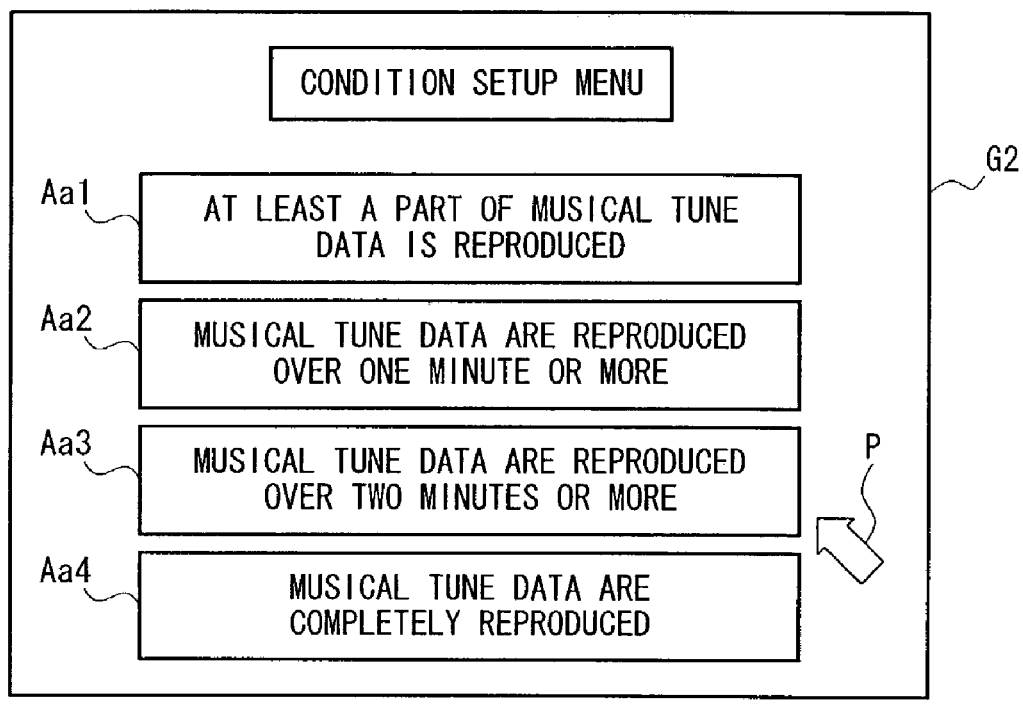
FIG. 7 shows an example of a condition setup menu that is displayed on the screen of the display allowing the user to arbitrarily select a desired condition prior to creation of a collection of musical tunes.

First, the CPU 11 controls the display 16 to display a prescribed image (referred to as a condition setup menu) G2 shown in FIG. 7 on the screen, which allows the user to select a desired condition according to which desired musical tune data within all musical tune data recorded on the CD 131 are selectively transferred to the hard disk drive 18 in step S401. That is, the aforementioned condition setup menu shown in FIG. 7 contains four regions Aa1 to As4 respectively corresponding to the aforementioned four conditions Ca1 to Ca4; therefore, the user can operate the input device 15 (e.g., mouse) to selectively designate one of four regions Aa1 to Aa4 in the condition setup menu G2 as similar to the foregoing operation mode selecting menu G1. Upon operation of the input device 15, the user selects one of the four conditions Ca1 to Ca4 in the condition setup menu G2. Herein, the user is not necessarily requested to select one of them; that is, when the user does not select any one of them, the CPU 11 determines that the user accepts the third condition Ca3, which was already set in the initial state.

Upon completion of user's condition setup, the flow proceeds to step S402 in which the CPU 11 instructs the CD drive 13 to read musical tune data from the CD 131. Upon receipt of such a read instruction, the CD drive 13 reads and outputs first musical tune data, which are listed in the first place within all musical tune data recorded on the CD 131, to the sound reproduction unit 17, so that it starts counting a playback time therefor. The musical tune data read from the CD 131 are supplied to the speaker 173 by way of the D/A converter 171 and the audio system 172, so that the speaker 173 produces musical tones corresponding to the musical tune data.

After issuing the read instruction to the CD drive 13, the CPU 11 waits for an end of playback of the musical tune data (see step S403). That is, the CPU 11 detects an end of playback of the musical tune data not only at the time when the musical tune data are completely reproduced but also at the time when the user stops it in the middle of the playback of the musical tune data and at the time when the user changes the musical tune data to the other musical tune data in the middle of the playback of the musical tune data.

Upon detection of an end of playback of the musical tune data in step S403, the CPU 11 obtains an elapsed time (i.e., a playback time) that is counted by the CD drive 13 from the playback start timing to the playback end timing with respect to the musical tune data. In step S404, the CPU 11 makes a decision as to whether or not the playback time satisfies the aforementioned condition that is selected in step S401. Suppose that the third condition Ca3 is selected in step S401, wherein the CPU 11 determines that the third condition Ca3 is satisfied if the playback time obtained from the CD drive 13 is two minutes or more, so that a decision result of step S404 is 'YES'. If the playback time is less than two minutes, the CPU 11 determines that the third condition Ca3 is not satisfied, so that a decision result of step S404 is 'NO'. If 'YES', the flow proceeds to step S405 in order to create a collection of musical tunes.

In step S405, the CPU 11 makes a decision as to whether or not the musical tune data, the end of playback of which is detected in step S403, were already stored in the hard disk drive 18. If the musical tune data have not been stored in the hard disk drive 18 yet, the flow proceeds to step S406 in which the CPU 11 requests the CD drive 13 to transfer the musical tune data thereto, so that the CPU 11 obtains from the CD drive 13 the musical tune data read from the CD 131. Then, the CPU 11 stores the musical tune data together with index data and playback history data (see FIG. 2) in the hard disk drive 18. The playback history data being stored in the hard disk drive 18 contains a total playback time that matches the aforementioned playback time given from the CD drive 13 (see step S404), and a number of playback times that is set to '1'.

When the musical tune data were already stored in the hard disk drive 18, the CPU 11 is not necessarily required to transfer the musical tune data from the CD 131 to the hard disk drive 18. In this case, only the playback history data are updated in correspondence with the musical tune data in the hard disk drive 18 in step S407. Specifically, the playback time given from the CD drive 13 is added to the total playback time of the musical tune data stored in the hard disk drive 18, and the number of playback times is increased by '1'.

When the CPU 11 determines in step S404 that the playback time of the musical tune data does not satisfy the preset condition (e.g., the third condition Ca3), the musical tune data presently reproduced do not construct a collection of musical tunes to be created; in other words, they do not suit the user's preference. Therefore, the flow directly proceeds to step S408 without intervention of step S405 or step S406.

When the CPU 11 determines in step S404 that the preset condition is not satisfied, or after the stored content of the hard disk drive 18 is updated in step S406 or step S407, the flow proceeds to step S408 in which the CPU 11 makes a decision as to whether or not the user operates the input device 15 to end the musical tune collection creation process. Upon user's operation of the input device 15, the CPU 11 ends the musical tune collection creation process shown in FIG. 6. If the user does not operate the input device 15, the flow returns to step S402, so that the CPU 11 instructs the CD drive 13 to read and reproduce the next musical tune data from the CD 131. Thereafter, until the user operates the input device 15, in other words, until the decision result of step S408 turns to 'YES', the CPU 11 repeatedly performs a series of steps S402 to S408. As a result, it is possible to create a collection of musical tunes suiting user's preference upon automatic selection of musical tune data satisfying the preset condition within all musical tune data recorded on the CD 131, so that the selected musical tune data are stored in the hard disk drive 18.

Figure 8:
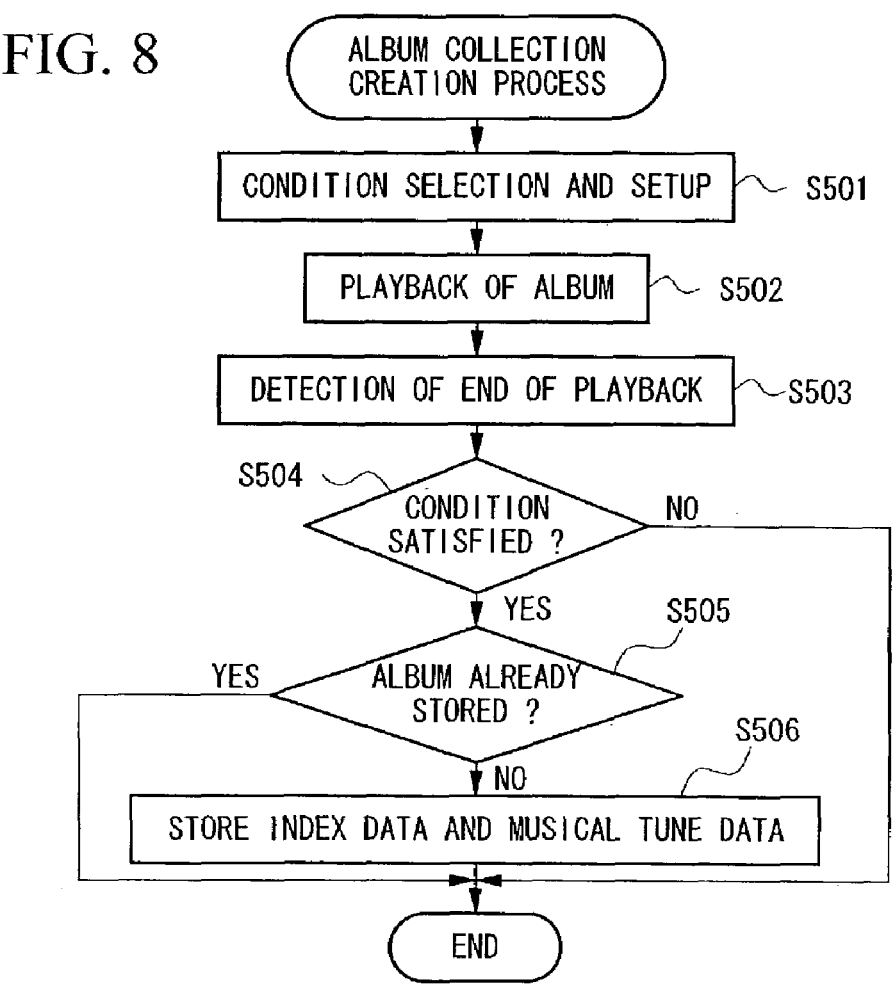
FIG. 8 is a flowchart showing an album collection creation process.
Figure 9:
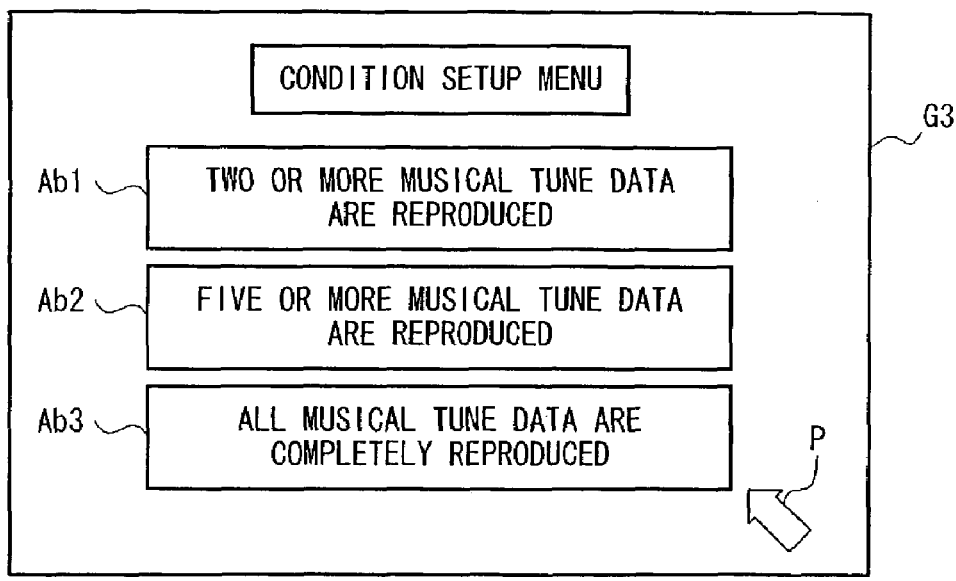
FIG. 9 shows an example of a condition setup menu that is displayed on the screen of the display allowing the user to arbitrarily select a desired condition prior to creation of a collection of albums.

Next, details of the album collection creation process of the foregoing step S5 shown in FIG. 5 will be described with reference to the flowchart of FIG. 8. In step S501, the CPU 11 controls the display 18 to display a condition setup menu G3 shown in FIG. 9 on the screen, allowing the user to arbitrarily select a desired condition for determining whether to store the content of an album recorded on the CD 131. Specifically, the condition setup menu G3 contains regions Ab1 to Ab3 respectively corresponding to the aforementioned conditions Cb1 to Cb3. Therefore, the user can select a desired condition by selectively designating one of the regions Ab1 to Ab3 in the condition setup menu G3 upon operation of the input device 15. If the user does not designate any one of the regions Ab1 to Ab3, the CPU 11 automatically determines that the user may agree with the second condition Cb2, which is initially set up.

Upon completion of the aforementioned condition setup, the flow proceeds to step S502 in which the CPU 11 instructs the CD drive 13 to read all the content of an album of the CD 131. Upon receipt of such a read instruction, the CD drive 13 sequentially reads all the musical tune data recorded on the CD 131, which are then supplied to the sound reproduction unit 17. Herein, it counts the number of musical tune data, each of which is completely reproduced from the beginning to the end without interruption. As a result, all the musical tune data recorded on the CD 131 are sequentially reproduced so that corresponding musical tones are produced by the speaker 173.

After outputting the aforementioned read instruction to the CD drive 13, the CPU 11 waits for an end of playback of an album of the CD 131 in step S503. That is, the CPU 11 detects an end of playback of an album not only at the time when all musical tune data of the album are completely reproduced, but also at the time when the user operates the input device 15 to stop the playback of the album in the middle of the reproduction of any one of musical tune data recorded on the CD 131. Upon detection of the end of playback, the CPU 11 obtains from the CD drive 13 the number of musical tune data that are sequentially reproduced after the issuance of the playback instruction before the detection of the end of playback. In step S504, the CPU 11 makes a decision as to whether or not the number satisfies the preset condition. Suppose that the second condition Cb2 is selected, wherein the CPU 11 determines that the present condition is satisfied when five or more of the musical tune data recorded on the CD 131 are completely reproduced from the beginning to the end, so that a decision result of step S504 is 'YES'. When less than five musical tune data are reproduced, the CPU 11 determines that the preset condition is not satisfied, so that a decision result of step S504 is 'NO'. In addition, it is unnecessary to add the content of the album, which does not satisfy the preset condition, to a collection of albums to be created. Therefore, when the decision result of step S504 is 'NO', the CPU 11 immediately ends the album collection creation process of FIG. 8.

When the number of the completely reproduced musical tune data satisfies the preset condition so that the decision result of step S504 is 'YES', the CPU 11 proceeds to add the album to a collection of albums to be created. That is, the flow proceeds to step S505 in which the CPU 11 makes a decision as to whether or not the content of the album has been already stored in the hard disk drive 18. When the content of the album has been already stored in the hard disk drive 18, it is unnecessary to store it again in the hard disk drive 18. Therefore, if 'YES' in step S505, the CPU 11 immediately ends the album collection creation process shown in FIG. 8.

When the CPU 11 detects that the content of the album is not stored in the hard disk drive 18, the flow proceeds to step S506, wherein the CPU 11 requests the CD drive 13 to transfer the content of the album of the CD 131 thereto, so that it receives all the musical tune data recorded on the CD 131 from the CD drive 13. Then, the CPU 11 stores the content of the album of the CD 131 in the hard disk drive 18 in accordance with the foregoing format shown in FIG. 3, wherein all musical tune data of the album are stored together with index data of the CD 131. Thereafter, the CPU 11 ends the album collection creation process shown in FIG. 8.

(B) Second Sequence Control for Utilization of the Created Collection of Musical Tunes or the Created Collection of Albums With reference to FIG. 10, a playback process of the music playback apparatus of FIG. 1 will be described with respect to a collection of musical tunes (referred to as a musical tune collection), which is created by the musical tune collection creation process of FIG. 6, and a collection of albums (referred to as an album collection) that is created by the album collection creation process of FIG. 8.

First, the user operates the input device 15 to designate playback of a musical tune collection or an album collection. In step S701, the CPU 11 makes a decision as to which of the musical tune collection or the album collection is selected by the user. When the user selects the musical tune collection, a decision result of step S701 is 'YES' so that the flow proceeds to step S702, wherein the CPU 11 displays on the screen of the display 16 a musical tune collection list L1 (see FIG. 11) based on index data and playback history data that are stored in the hard disk drive 18 with respect to musical tune data included in the musical tune collection. The musical tune collection list L1 comprises several items with respect to each of musical tune data included in the musical tune collection, such as the disk ID of the digital audio media storing the musical tune data, the musical tune number of the musical tune data, as well as the number of playback times and the total playback time of the musical tune data, all of which are related to each other. For example, the musical tune data designated by the musical tune number "Music001" in the musical tune collection list L1 are recorded on the digital audio media whose disk ID is "Disk[A]" and were reproduced "five times" in the past with the total playback time of "18:26" (i.e., 18 minutes and 26 seconds).

In step S703, the CPU 11 makes a decision as to whether or not the user issues a rearrangement instruction for rearranging musical tune data included in the musical tune collection list L1 in order. Upon receipt of such an rearrangement instruction, the CPU 11 proceeds to rearrangement of items of the musical tune collection list L1 (e.g., musical tune numbers and disk IDs) on the basis of total playback times of musical tune data in step S704. Specifically, the CPU 11 changes the musical tune collection list L1 of FIG. 11 with a new musical tune collection list L10 shown in FIG. 12, in which musical tune data are rearranged in the order of longer total playback times, so that the new musical tune collection list L10 is to be displayed on the screen of the display 16. In contrast, when the CPU 11 determines that the user does not issue a rearrangement instruction, the flow directly proceeds to step S705 without intervention of step S704.

In the above, the user can select any one of the musical tune data included in the musical tune collection list (e.g., L1 or L10) as a playback material upon operation of the input device 15. In step S705, the CPU 11 makes a decision as to whether or not the user selects musical tune data included in the musical tune collection list. If 'YES', the CPU 11 reads the selected musical tune data from the hard disk drive 18 and outputs them to the sound reproduction unit 17 in step S706. As a result, the selected musical tune data are to be completely reproduced from the beginning to the end, wherein the CPU 11 waits for a while until the user stops playback in the middle of reproduction of the selected musical tune data in step S707, which is similar to the foregoing step S403 shown in FIG. 6. Upon detection of an end (or a stop) of playback, the CPU 11 updates the playback history data of the musical tune data (i.e., the number of playback times and the total playback time) based on an elapsed time which is counted from the start timing of playback to the end timing of playback in step S708, which is similar to the foregoing step S407 shown in FIG. 6. When the CPU 11 completes updating the playback history data in step S708, or when the CPU 11 determines that the user does not select any one of musical tune data contained in the musical tune collection list so that the decision result of step S705 is 'NO', the flow proceeds to step S720.

When the user does not select musical tune collection, in other words, when the user selects the album collection so that the decision result of step S701 is 'NO', the flow proceeds to step S710, wherein the CPU 11 controls the display 16 to display on the screen an album collection list L2 shown in FIG. 13 based on index data of albums whose contents are stored in the hard disk drive 18 as the album collection. The album collection list L2 of FIG. 13 comprises disk IDs of digital audio media storing albums and musical tune numbers representing musical tune data included in albums.

In step S711, the CPU 11 makes a decision as to whether or not the user selects any one of albums contained in the album collection list. If 'YES', the flow proceeds to step S712 in which the CPU 11 sequentially reads from the hard disk drive 18 all musical tune data of the selected album, which are respectively supplied to the sound reproduction unit 17. Thereafter, when the playback of the album is ended in step S713, or when the user does not select any one of albums contained in the album collection list so that the decision result of step S711 is 'NO', the flow proceeds to step S720.

In step S720, the CPU 11 makes a decision as to whether or not the user operates the input device 15 to end (or stop) the playback process. When the user issues an instruction to end (or stop) the playback process, the CPU 11 immediately ends the playback process of FIG. 10. In contrast, when the user does not end (or stop) the playback process, the flow returns to step S701 to repeat the aforementioned steps.

As described above, in the musical tune collection creation mode, the present embodiment stores in the hard disk drive 18 prescribed musical tune data whose number of playback times exceeds a prescribed number among all musical tune data recorded on the digital audio medium. Generally speaking, a user tends to play back musical tune data suiting the user's preferences for a long time, whereas the user may stop playback of musical tune data that do not suit the user's preferences. According to the present embodiment, the user is not required to select preferred musical tune data each time musical tune data are reproduced; therefore, it is possible for the user to automatically and easily create a collection of preferred musical tunes.

In the album collection creation mode, the present embodiment stores in the hard disk drive 18 an album of a digital audio medium in which the number of musical tune data reproduced in the past exceeds the prescribed number. Generally speaking, a user tends to prefer albums each of which contains a relatively large number of musical tune data, suiting the user's preferences. Therefore, the present embodiment does not require the user to perform manual operations in making a decision as to whether or not each album suits the user's preference when played back. That is, the present embodiment can reduce a user's burden in selecting albums suiting the user's preference. In addition, the present embodiment allows the user to arbitrarily select a desired condition for selecting musical tune data in creation of a musical tune collection and/or a desired condition for selecting albums in creation of an album collection. Thus, it is possible for the user to create the musical tune collection and/or the album collection, which reflect the user's preferences.

Furthermore, the present embodiment is designed to automatically transfer musical tune data recorded on digital audio media such as the CD 131 and MD 141 to the hard disk drive 18. Generally, an accessing speed of the hard disk drive 18 is greater than an accessing speed of the CD 131 and the MD 141. For this reason, it is possible to noticeably reduce the time required for starting playback of musical tune data suiting a user's preference.

Moreover, the present embodiment allows a user to rearrange the order of musical tune data contained in the musical tune collection list L1 in response to their total playback times. This facilitates the user easily selecting musical tune data particularly suiting the user's preferences among all musical tune data contained in the musical tune collection. Incidentally, this invention is not necessarily limited to the present embodiment in which musical tune data are rearranged in order in response to total playback times. That is, it is possible to modify the present embodiment in such a way that musical tune data are rearranged in order in response to playback times.

2. Second Embodiment

Next, a description will be given with respect to a second embodiment of the invention, which is similar to the foregoing first embodiment in configuration (see FIG. 1); hence, the detailed description thereof will be omitted.

The first embodiment is designed in such a way that, as shown in FIG. 11, a musical tune collection list L1 contains only the musical tune data that are already stored in the hard disk drive 18 among all musical tune data recorded on a digital audio medium. In contrast, the second embodiment is designed in such a way that a musical tune collection list can contain other musical tune data, which are not stored in the hard disk drive 18. In addition, the overall operation of the second embodiment is basically similar to that of the first embodiment, which is described in conjunction with the flowcharts of FIGS. 4, 6, 8, and 10, whereas the second embodiment partially differs from the first embodiment in operation. Therefore, the following description will be made with respect to operational differences between the first embodiment and the second embodiment; hence, detailed description regarding the common operation therebetween will be omitted.

First, when the user enters a digital audio medium as a new playback material into the music playback apparatus of FIG. 1, the CPU 11 transfers identification information, which identify all musical tune data recorded on the digital audio medium, to the hard disk drive 18. Specifically, upon detection of insertion of the digital audio medium in step S1 shown in FIG. 4, the CPU 11 reads TOC information of the digital audio medium to transfer its disk ID and musical tune numbers assigned to all musical tune data to the hard disk drive 18. Incidentally, the second embodiment performs the musical tune collection creation process of FIG. 6 and the album collection creation process of FIG. 8 similarly to the first embodiment.

Figure 14:
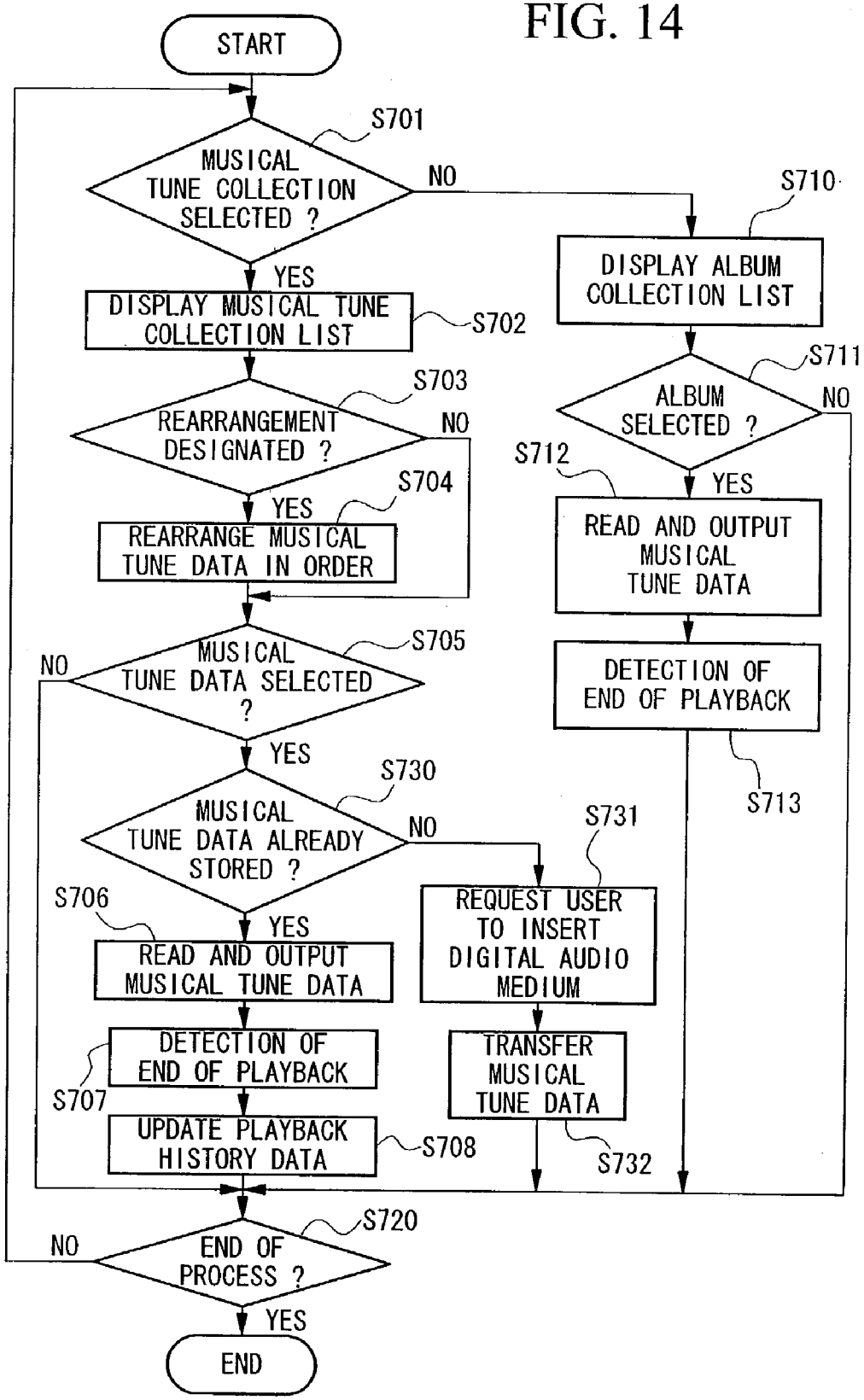
FIG. 14 is a flowchart showing a playback process using a musical tune collection or an album collection in accordance with a second embodiment of the invention.

With reference to FIG. 14, a description will be given with respect to a playback process using a musical tune collection and an album collection in accordance with the second embodiment of the invention. The playback process of FIG. 14 differs from the aforementioned playback process of FIG. 10 in the content of step S702 (for displaying a musical tune collection list) and in contents of steps following step S705 (for selecting musical tune data).

When the user selects the musical tune collection in step S701, the CPU 11 displays a musical tune collection list L3 on the screen of the display 16. FIG. 15 shows an example of the musical tune collection list L3, which comprises disk IDs of digital audio media, musical tune numbers of all musical tune data recorded on digital audio media, as well as numbers of playback times and total playback times of musical tune data, which are reproduced in the past.

Figure 6:
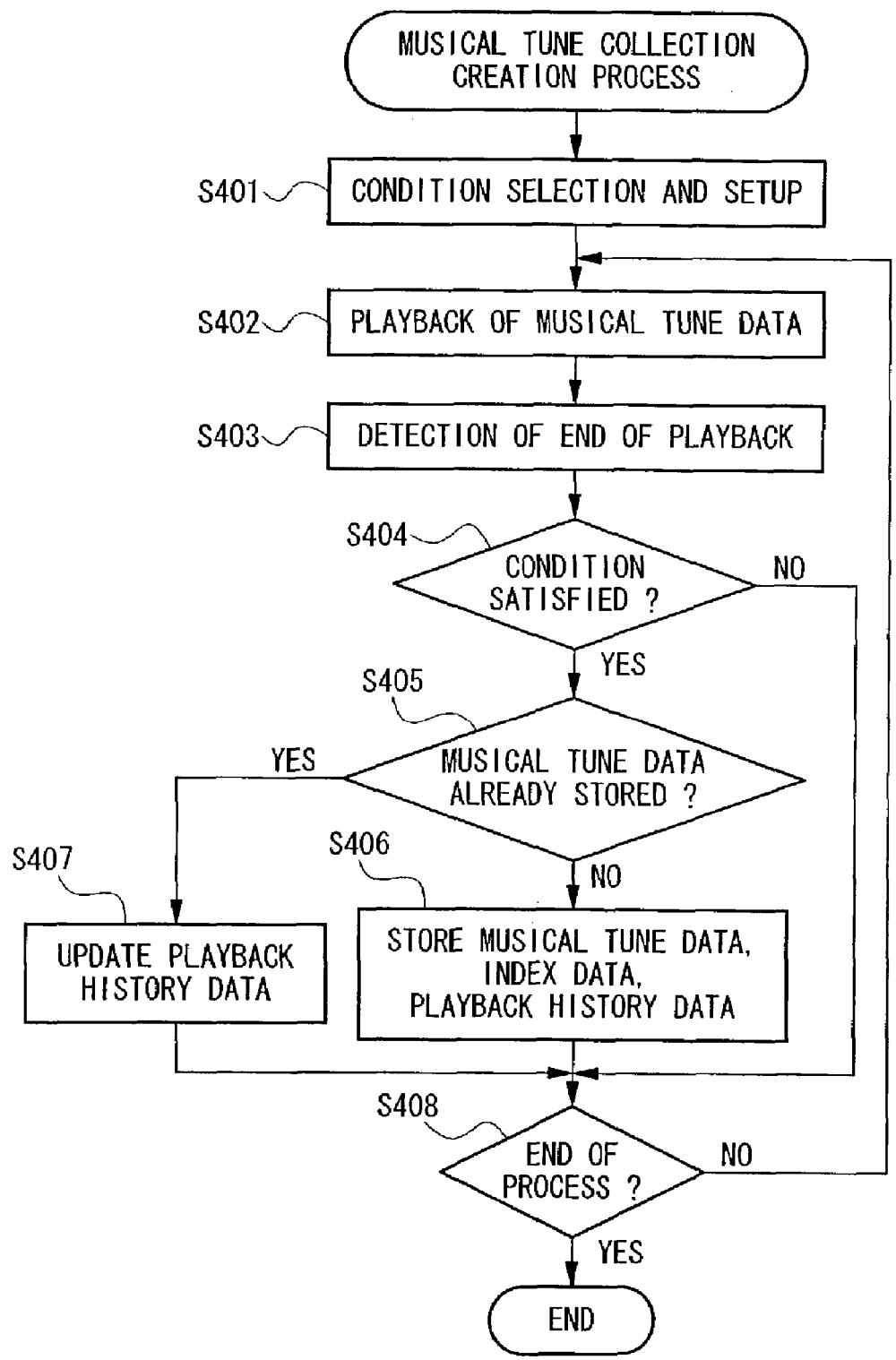
FIG. 6 is a flowchart showing a musical tune collection creation process.

The musical tune collection list L3 is created in such a way that "un-stored" musical tune data, which are not stored in the hard disk drive 18, are displayed in a different manner compared with "pre-stored" musical tune data which are already stored in the hard disk drive 18 (see step S406 in FIG. 6). In the case of the musical tune list L3 shown in FIG. 15, for example, various musical tune data whose musical tune numbers range from "Music001" to "Music005" are displayed with respect to a digital audio medium whose disk ID is "Disk[A]", wherein two musical tune data entitled "Music001" and "Music003" are already stored in the hard disk drive 18 while the other three musical tune data entitled "Music002", "Music004", and "Music005" are not stored in the hard disk drive 18. That is, the pre-stored musical tune data are each displayed using standard characters, while the un-stored musical tune data are each displayed using highlighted characters (e.g., italic or boldface), for example.

When the user selects any one of musical tune data contained in the musical tune collection list L3 so that a decision result of step S705 shown in FIG. 14 is 'YES', the flow proceeds to step S730 in which the CPU 11 makes a decision as to whether or not the selected musical tune data are already stored in the hard disk drive 18. If 'YES' in step S730, the CPU 11 performs a series of steps (e.g., S706-S708), contents of which are described in the first embodiment in conjunction with FIG. 10.

When the selected musical tune data are not stored in the hard disk drive 18 so that the decision result of step S730 is 'NO', the flow proceeds to step S731 in which the CPU 11 controls the display 16 to display a prescribed message requesting the user to insert a digital audio medium that stores the selected musical tune data on the screen. Suppose that the user selects musical tune data "Music002" allocated to the disk ID "Disk[A]" in the musical tune collection list L3, wherein the display 16 displays on the screen the following message:

"This musical tune data is not stored in the hard disk drive. Please set Disk[A]."

In response to the aforementioned notification, when the user inserts the corresponding digital audio medium (i.e., CD 131) into the CD drive 13 of the music playback apparatus of FIG. 1, the CPU 11 automatically reads the musical tune data, which are selected in the foregoing step S705, and store them in the hard disk drive 18 in conformity with the foregoing format shown in FIG. 2 in step S732. Then, the flow proceeds to step S720. As a result, the musical tune number of the un-stored musical tune data, which are not originally stored in the hard disk drive 18 and are selected by the user in step S705, are changed in characters from highlighted characters (e.g., italic or boldface) to standard characters in the musical tune collection list L3 displayed on the screen of the display 16. Thus, through the foregoing step S705, the newly stored musical tune data are subjected to foregoing steps (e.g., S706-S708) so that they are reproduced.

As described above, the second embodiment can demonstrate noticeable effects similar to those of the first embodiment. In addition, the second embodiment is designed to automatically notify the user of the digital audio medium that stores the selected musical tune data, which are not originally stored in the hard disk drive 18. Therefore, the user can easily recognize the digital storage medium storing the selected musical tune data, which are not originally included in the musical tune collection, visually on the screen of the display 16. Furthermore, the user can easily add un-stored musical tune data, which do not satisfy the preset condition and are not originally included in the musical tune collection, to the musical tune collection upon user's selection as necessary.

The second embodiment uses the musical tune collection list L3 of FIG. 15 in which pre-stored musical tune data are each displayed using standard characters while un-stored musical tune data are each displayed using highlighted characters (e.g., italic or boldface). Of course, differences between the pre-stored musical tune data and the un-stored musical tune data are not necessarily realized using different types of characters. That is, they can be realized using different colors of characters, different sizes of characters, and other different types (or forms) of characters, for example. In summary, the present embodiment actualizes visual distinctions between the pre-stored musical tune data and the un-stored musical tune data, which the user can easily recognize on the screen of the display 16.

In addition, the present embodiment visually displays information regarding a digital audio medium, which the user is requested to insert into the CD drive 13 of the music playback apparatus of FIG. 1, by using prescribed characters (or images as possible). Of course, the present embodiment can be modified to produce vocalized sounds representing a digital audio medium that the user is requested to insert into the CD drive 13, for example. In summary, the present embodiment actualizes clear notification in which the user is notified of information specifying a digital audio medium storing un-stored musical tune data, which are not originally stored in the hard disk drive 18.

3. Third Embodiment

Next, a description will be given with respect to a third embodiment of the invention, wherein similar to the foregoing embodiments, after musical tune data recorded on a digital audio medium are reproduced, the musical tune data are automatically stored in the hard disk drive 18. In addition, the third embodiment is characterized in that upon user's designation of a specific time period or a specific time zone, musical tune data that are already reproduced in the past in relation to the specific time period or time zone are automatically extracted from the hard disk drive 18. Details will be described below, wherein the overall configuration of the music playback apparatus applied to the third embodiment is identical to the aforementioned configuration shown in FIG. 1; hence, the detailed description thereof will be omitted.

First, the user inserts the CD 131 into the CD drive 13 and then selects any one of musical tune data as a playback material. The CD drive 13 reads from the CD 131 the selected musical tune data, which are supplied to the sound reproduction unit 17. At this time, the CD drive 13 notifies the CPU 11 of a set of information representing a playback start time (i.e., time and date for starting playback), the disk ID of the digital audio medium, and the musical tune number of the musical tune data selected as the playback material. Upon completion of the playback of the selected musical tune data, the CPU 11 obtains the musical tune data from the CD drive 13 and then transfers them to the hard disk drive 18 together with the playback history data, which represent the aforementioned playback start time notified to the CPU 11 in advance, and the index data containing the disk ID and musical tune number in conformity with a format shown in FIG. 16. In addition, when pre-stored musical tune data, which are already stored in the hard disk drive 18, are reproduced, the corresponding playback time is automatically added to the playback history data.

Figure 17:
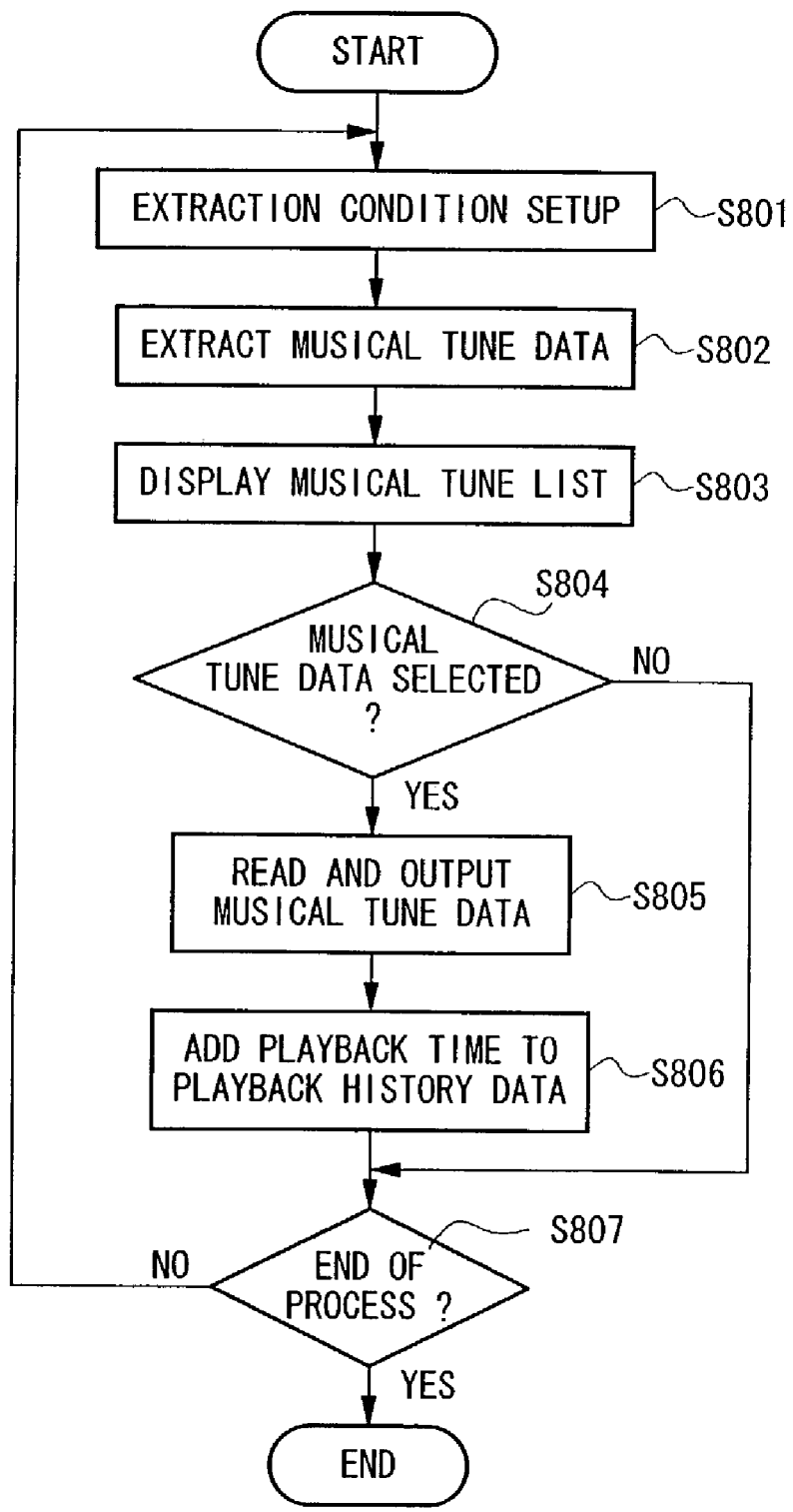
FIG. 17 is a flowchart showing an extraction process for extracting musical tune data suiting prescribed conditions in accordance with the third embodiment of the invention.

Next, the user operates the input device 15 so that the CPU 11 performs a playback process with respect to musical tune data stored in the hard disk drive 18. FIG. 17 is a flowchart showing details of the playback process, wherein the flow firstly proceeds to step S801 in which the CPU 11 controls the display 16 to display on the screen a prescribed image (namely, an extraction condition setup menu) G4 shown in FIG. 18, which allows the user to input an extraction condition for extracting desired musical tune data from musical tune data stored in the hard disk drive 18 as a playback material. The extraction condition setup menu G4 contains regions Ac1 and Ac2 for allowing the user to input the start and end of a certain time period, and regions Ac3 and Ac4 for allowing the user to input the start and end of a certain time zone. That is, the user operates the input device 15 (i.e., a pointing device and a keyboard) to input desired numbers into the regions Ac1 to Ac4 respectively. Herein, the user can input desired numbers into all the regions Ac1 to Ac4. Alternatively, the user can input desired numbers into the regions Ac1 and Ac2 regarding the time period only, or the user can input desired numbers into the regions Ac3 and Ac4 regarding the time zone only.

After completion of inputting numbers into the aforementioned regions, the CPU 11 searches for musical tune data corresponding to playback history data whose time data match the input time period or the input time zone among all musical tune data stored in the hard disk drive 18 in step S802, thus extracting (or retrieving) the corresponding musical tune data. Based on extraction (or retrieval) results, the CPU 11 controls the display 16 to display a musical tune list L4 shown in FIG. 19 on the screen in step S803. The musical tune list L4 comprises musical tune numbers of the retrieved musical tune data, disk IDs of digital audio media storing the retrieved musical tune data, as well as playback dates and playback times regarding the retrieved musical tune data.

Figures 18, 19:
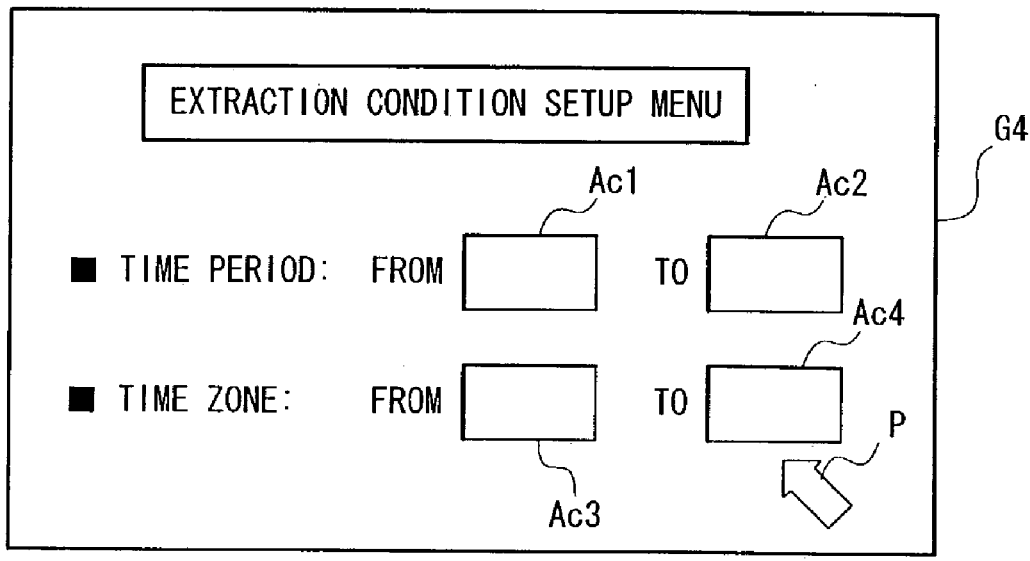
FIG. 18 shows an example of an extraction condition setup menu.
FIG. 19 shows an example of a musical tune list containing extracted musical tune data.

Suppose that in step S801, the user inputs "7/1" (representing July 1) into the region Ac1 while also inputting "8/31" (representing August 31) into the region Ac2, for example. In this case, the CPU 11 extracts musical tune data whose playback dates belong to the time period ranging from "July 1" to "August 31" with reference to playback history data of musical tune data stored in the hard disk drive 18. As a result, the musical tune list L4 containing a variety of information regarding musical tune data, which are reproduced in the time period ranging from July 1 to August 31, is displayed on the screen of the display 16 in step S803. Incidentally, the musical tune list L4 shown in FIG. 19 is an example in which various musical tune data are listed in response to the time period input by the user. Of course, it is possible to display a similar musical tune list in response to the time zone input by the user, or it is possible to display a similar musical tune list in response to both the time period and time zone input by the user.

In step S804, the CPU 11 makes a decision as to whether or not the user selects any one of musical tune data contained in the musical tune list L4. If 'YES', the flow proceeds to step S805 in which the CPU 11 reads the selected musical tune data from the hard disk drive 18 and transfers them to the sound reproduction unit 17. As a result, the sound reproduction unit 17 produces musical tones corresponding to the selected musical tune data. In step S806, the CPU 11 adds the present playback start time to the playback history data related to the selected musical tune data, which are presently reproduced. Then, the flow proceeds to step S807. When the CPU 11 determines in step S804 that the user does not select any one of the musical tune data contained in the musical tune list L4, the flow directly proceeds to step S807 without intervention of steps S805 and S806. Thereafter, the CPU 11 repeatedly performs a series of steps S801 to S806 until the user operates the input device 15 to end the playback process of FIG. 17.

According to the third embodiment described above, desired musical tune data are automatically extracted from musical tune data stored in the hard disk drive 18 in response to the time period or time zone, which is designated by the user. This allows the user to easily retrieve desired musical tune data, which are reproduced in the past with reference to the designated time period and/or the designated time zone. Suppose that the user designates the summer (e.g., July and August) in step S801, for example, wherein the display 16 automatically displays on the screen a musical tune list listing musical tune data, which the user had heard in the summer in the past. When the user designates the morning time period (e.g., 6 a.m. to 8 a.m.), the display 16 displays on the screen a musical tune list listing musical tune data, which the user had heard in the morning in the past. Thus, the third embodiment allows the user to easily retrieve musical tune data suiting a user's lifestyle or user's biorhythm in daily life.

4. Modifications

As described above, this invention is described with reference to the aforementioned embodiments, which can be modified in various ways without departing from the scope of the invention. Therefore, examples of modifications will be described below.

(A) First Modification

The first embodiment is designed to rearrange information data (e.g., characters) regarding musical tune data in order in response to total playback times. Herein, it is possible to change display manners of musical tune data without changing arrangement of information data or with rearranging information data in order. That is, it is possible to change sizes of characters in response to total playback times of musical tune data, or it is possible to change colors or brightness of characters in response to total playback times of musical tune data. For example, the musical tune data having the longest total playback time are displayed using characters of relatively large sizes, while characters regarding other musical tune data are gradually decreased in sizes as total playback times become shorter. Alternatively, it is possible to display musical tune data by using bar graphs displaying rectangular bars whose heights reflect total playback times.

(B) Second Modification

To cope with an environment where multiple users use a single music playback apparatus, it is possible to modify the first embodiment in such a way that a musical tune collection and/or an album collection is created for each user. That is, different identification numbers are assigned to each of a plurality of users, allowing creation of the musical tune collection and/or album collection for each identification number. Details will be described below.

Prior to the foregoing step S2 shown in FIG. 2, each user is requested to input his/her identification number into the music playback apparatus. In the foregoing step S406 shown in FIG. 6, the hard disk drive 18 is controlled to store musical tune data, index data, and playback history data (see FIG. 2) in relation to the input identification number. Similarly, in the foregoing step S506 shown in FIG. 8, the hard disk drive 18 is controlled to store contents of an album and index data (see FIG. 3) in relation to the input identification number. Thus, it is possible to create a musical tune collection and/or an album collection for each user.

Figure 10:
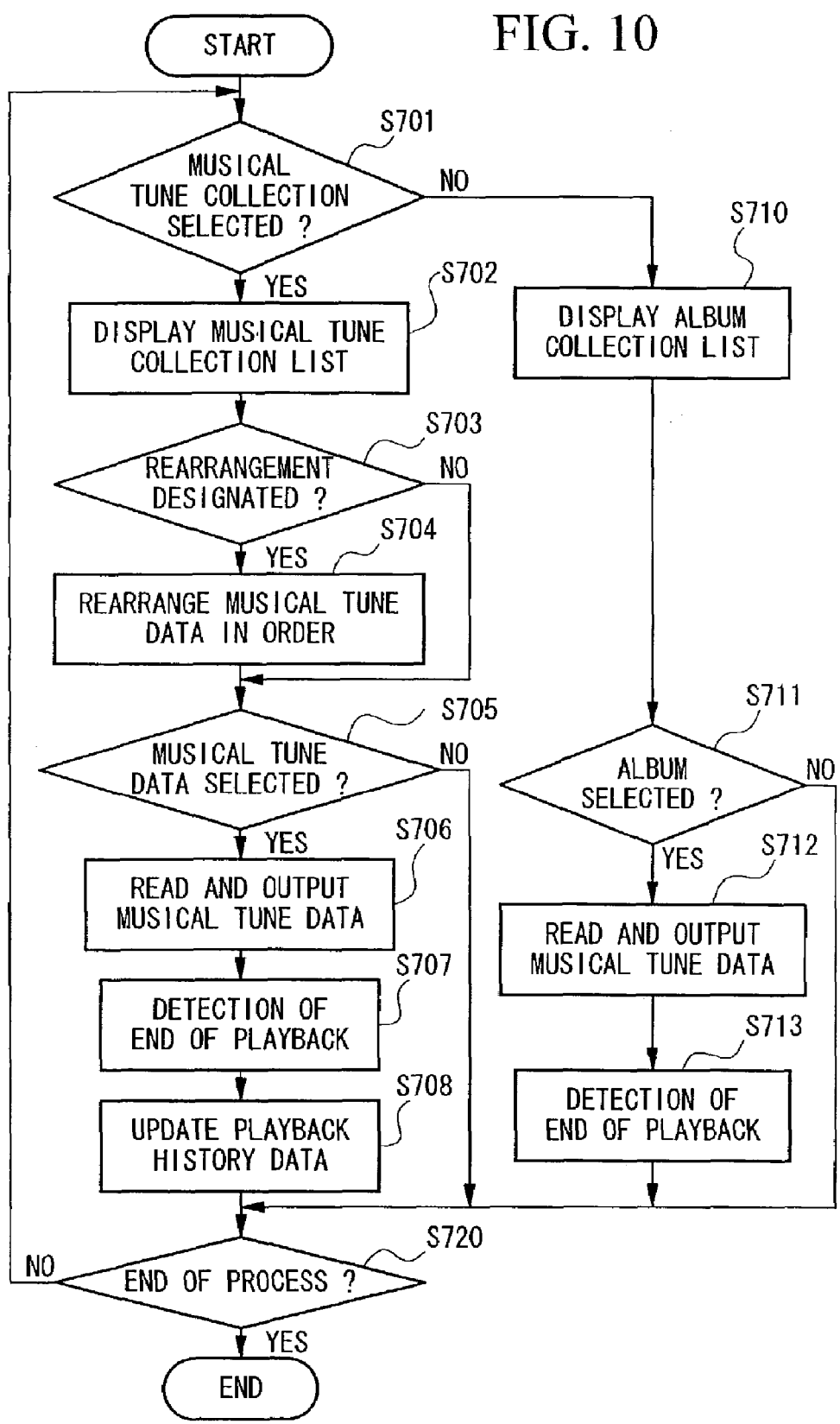
FIG. 10 is a flowchart showing a playback process using a musical tune collection or an album collection.

In addition, prior to the foregoing step S701 shown in FIG. 10, each user is requested to input his/her identification number into the music playback apparatus. In step S702, the display 16 is controlled to display on the screen a musical tune collection list (see FIG. 11) whose content is specified in response to the input identification number. In step S710, the display 16 is controlled to display on the screen an album collection list (see FIG. 13) whose content is specified in response to the input identification number. Alternatively, it is possible to display the musical tune collection list and/or album collection list, contents of which are created by all users, in relation to identification numbers of users on the screen of the display 16. FIG. 20 shows an example of the musical tune collection list that contains a musical tune collection created by a user having an identification number "ID01" and another musical tune collection created by another user having an identification number "ID02".

In the aforementioned modification, it is possible to produce noticeable effects similar to those of the first embodiment. In addition, the aforementioned modification allows multiple users to arbitrarily create musical tune collections and/or album collections suiting users' preferences by using a single music playback apparatus. When multiple users have common musical tune data to be stored in the same hard disk drive, it is unnecessary to store musical tune data specifically created by each user in the hard disk drive; in other words, the common musical tune data should be stored once in the hard disk drive. Thus, it is possible to use storage areas of the hard disk drive efficiently. Of course, the aforementioned modification can be applied to the second embodiment and the third embodiment respectively.

(C) Third Modification

The first embodiment is designed in such a way that musical tune data to be stored in the hard disk drive 18 are selected in response to playback times in the musical tune collection creation mode. Herein, conditions for selecting musical tune data to be stored in the hard disk drive 18 are not necessarily limited to playback times. That is, it is possible to modify the first embodiment in such a way that musical tune data, which are repeatedly reproduced in the past multiple times so that numbers of playback times exceed a prescribed number of playback times, are selectively stored in the hard disk drive 18. In this case, numbers of playback times are counted with respect to un-stored musical tune data that are not stored in the hard disk drive 18, wherein one or some un-stored musical tune data whose numbers of playback times sequentially counted exceed the prescribed number of playback times at the specific timing are selectively stored in the hard disk drive 18. Alternatively, musical tune data whose accumulated times in playback in the past (i.e., whose total playback times) exceed the prescribed time are selectively stored in the hard disk drive 18. Incidentally, conditions for selecting musical tune data to be stored in a prescribed storage device (e.g., hard disk drive 18) are not necessarily limited to numbers of playback times and total playback times. In summary, musical tune data that satisfy prescribed conditions regarding statuses of outputs to the sound reproduction unit 17 are selectively stored in the hard disk drive 18.

The aforementioned first embodiment and second embodiment present plural conditions for user's selection with respect to musical tune data (or albums) to be stored in the hard disk drive 18 in advance, so that the user can select any one of conditions when selecting musical tune data (or albums). Alternatively, it is possible to modify the aforementioned embodiments in such a way that the user can arbitrarily set desired conditions. That is, in the foregoing step S401 shown in FIG. 6, the user can arbitrarily input a desired number as a playback time, which is a key condition for selecting musical tune data to be stored in the hard disk drive 18. Similarly, in the step S501, the user can arbitrarily input a desired number as a number of musical tune data, which is a key condition for selecting an album to be stored in the hard disk drive 18. Of course, the user is not always requested to input these conditions for selecting data to be stored in the hard disk drive 18. That is, it is possible to fixedly set one of these conditions to the prescribed value.

(D) Fourth Modification

The aforementioned first embodiment and second embodiment are designed in such a way that after completion of the playback of a digital audio medium, musical tune data of a digital audio medium are selectively transferred to the hard disk drive 18. Of course, it is possible to simultaneously perform the playback and transfer of musical tune data recorded on the digital audio medium to the hard disk drive 18 in parallel processing.

In the musical tune collection creation mode of the first embodiment, for example, at each time when a part of musical tune data is read from the digital audio medium and is output to the sound reproduction unit 17, the musical tune data are temporarily stored in a prescribed storage area (referred to as a temporary storage area) of the hard disk drive 18. After completion of the playback of the musical tune data, a decision is made as to whether or not the playback time thereof satisfies the prescribed condition. If satisfied, the musical tune data that are temporarily stored in the temporary storage area are automatically transferred to another storage area for storing the content of a musical tune collection to be created. If not satisfied, the CPU 11 automatically discards the musical tune data temporarily stored in the temporary storage area. In the aforementioned modification, it is possible to produce noticeable effects similar to those of the first embodiment. Incidentally, the aforementioned modification is described in respect to the musical tune collection creation mode, however, it can be applied to the album collection creation mode as well.

(E) Fifth Modification

In the first embodiment and second embodiment, musical tune data whose playback times satisfy prescribed conditions and/or albums satisfying prescribed conditions regarding numbers of musical tune data reproduced in the past are completely stored in the hard disk drive 18. Herein, it is possible to store a prescribed part of each single musical tune data in the hard disk drive 18. Suppose that in the musical tune collection creation mode of the first embodiment, for example, the second condition Ca2 or the third condition Ca3 is selected, wherein the corresponding musical tune data are reproduced over the prescribed time or more. Upon completion of the playback of the musical tune data satisfying the selected condition, a part of the musical tune data is stored in the hard disk drive 18. Thus, it is possible to effectively save storage capacity of the hard disk drive 18.

(F) Sixth Modification

In the aforementioned embodiments, musical tune data and/or albums each containing plural musical tune data, which are each constituted by audio data (and text data), are exclusively stored in the hard disk drive 18. Since this invention is not necessarily applied to digital audio media that records audio data (and text data), the aforementioned embodiments are modified to cope with other digital storage media that record image data (or picture data) together with musical tune data. In this case, it is possible to store image data and musical tune data in the hard disk drive 18. Therefore, it is possible to output image data to the display 16 in parallel with reading operations on musical tune data from the hard disk drive 18.

(G) Seventh Modification

Recently, MIDI data based on the MIDI standard (where 'MIDI' stands for 'Musical Instrument Digital Interface') are stored in floppy disks, while musical tones (e.g., accompaniment sounds) corresponding to MIDI data are reproduced in parallel with playback of a CD or a MD, which records musical tune data. That is, it is possible to modify the aforementioned embodiments in such a way that musical tune data recorded on the CD 131 or the MD 141 are transferred to the hard disk drive 18 in relation to MIDI data, for example. Thus, when the musical tune data stored in the hard disk drive 18 are reproduced, the MIDI data are correspondingly output to a sound source (not shown) to produce musical tones. As a result, it is possible to produce musical tones having richness or variety in sound components compared with musical tones that are produced using the digital audio medium (e.g., CD 131 or MD 141) only.

(H) Eighth Modification

The aforementioned embodiments exclusively use the CD 131 and the MD 141 as examples of digital audio media. Of course, it is possible to use other digital audio media (or other digital storage media). For example, it is possible to use various types of media such as a DVD (i.e., digital versatile disk), an LD (i.e., laser disk), and a floppy disk other than the CD and MD.

(I) Ninth Modification

This invention is not necessarily realized by specific hardware configurations and can be realized by software configurations. That is, musical tune playback controls of this invention can be realized by programs executed by a computer having a media processor (corresponding to functions of the CD drive 13 and/or the MD drive 14), which processes plural musical tune data recorded on a digital audio medium (or digital storage medium) and supplies desired one of musical tune data to the sound reproduction unit 17, for example. The software implementing musical tune playback controls of this invention can be divided into three types of programs, which will be described below.

A first program is described to implement two functions, that is, a first function for controlling the computer to store musical tune data, which the media processor outputs to the sound reproduction unit over a prescribed time or more, in a digital storage device (e.g., hard disk drive 18 used in the aforementioned embodiments), and a second function for upon receipt of a playback instruction, controlling the computer to read the musical tune data from the digital storage device and to output them to the sound reproduction unit. A second program is described to implement two functions, that is, a first function for controlling the computer to store the content of an album, in which the media processor outputs more than a prescribed number of musical tune data to the sound reproduction unit, in the digital storage device, and a second function for upon receipt of a playback instruction of the album, reading any one of musical tune data from the digital storage device and for outputting it to the sound reproduction unit. A third program is described to implement two functions, that is, a first function for controlling the computer to store musical tune data, which the media processor outputs to the sound reproduction unit, and playback history data representing the output timing in the digital storage device, and a second function for upon receipt of a playback instruction, reading musical tune data whose playback history data satisfy the prescribed condition among all musical tune data stored in the digital storage device and for outputting them to the sound reproduction unit.

Furthermore, this invention can be realized by computer-readable media that store the aforementioned programs. As computer-readable media, it is possible to use portable recording media such as floppy disks and CD-ROMs, as well as magnetic disks and semiconductor memories, for example.

As described heretofore, this invention has a variety of effects and technical features, which will be described below.

(1) According to a musical tune playback control apparatus of this invention, with reference to contents of digital audio media (or digital storage media), the user can arbitrary select desired musical tune data and/or albums, which are transferred to a storage device such as a hard disk drive. Herein, this invention is characterized by automatically selecting musical tune data and/or albums to be stored in the storage device in response to playback histories. Therefore, it is possible to reduce a user's burden in selecting musical tune data and/or albums suiting user's preference.

(2) That is, musical tune data whose playback histories satisfy prescribed conditions are automatically and selectively stored in the storage device without requiring the user to perform troublesome operation in selecting desired musical tune data suiting user's preference, thus allowing the user to easily create a musical tune collection containing at least one musical tune data. Conditions are described in such a way that a media processor (e.g., a CD drive or a MD drive) outputs musical tune data to a sound reproduction unit over a prescribed time or more, or the media processor outputs musical tune data to the sound reproduction unit a prescribed number of times or more. This is because ordinary users may generally tend to play back musical tune data suiting users' preferences for a longer time or at a higher frequency as compared with other musical tune data that do not suit users' preferences. By adapting such a general tendency regarding the user's behavior in playback of music, it is possible for the user to easily create a musical tune collection containing desired musical tune data suiting user's preference without requiring the user to perform troublesome operation in selecting musical tune data. Incidentally, conditions are not necessarily limited to the aforementioned ones using the output time of musical tune data and the number of times for repeatedly outputting musical tune data. In summary, it is required that any one of musical tune data recorded on the digital audio medium (or digital storage medium) be selectively transferred to the storage device in response to the status of being output to the sound reproduction unit.

(3) In addition, at least one album is selected in response to the number of musical tune data, which are reproduced in the past, so that the content of the selected album is stored in the storage device. Therefore, it is possible for the user to easily create an album collection containing at least one album suiting the user's preference without requiring the user to perform troublesome operations in selecting desired albums. This is because ordinary users may generally tend to prefer albums, each of which contains a relatively large number of musical tune data suiting users' preferences. By adapting such a psychological tendency regarding the user's preference in listening to musical tunes contained in albums, it is possible for the user to easily create an album collection containing at least one album suiting the user's preference.

(4) As the aforementioned digital audio media (or digital storage media), it is possible to use CDs, MDs, LDs, DVDs, and floppy disks, for example. In addition, it is possible to use a hard disk drive containing magnetic disks as the storage device installed in the music playback apparatus adapting the musical tune playback control apparatus, for example. Herein, the storage device does not necessarily store a complete set of information of each single musical tune data, in other words, it is possible to store a prescribed part of musical tune data in the storage device.

(5) Musical tune data are read from a digital audio medium (or a digital storage medium) and are reproduced in the music playback apparatus, which in turn produces playback history data. Therefore, musical tune data, which are reproduced in the past, are stored in the storage device together with playback history data. Herein, it is possible to automatically select musical tune data whose playback history data satisfy prescribed conditions from among pre-stored musical tune data stored in the storage device. That is, it is possible for the user to easily select desired musical tune data, which were reproduced in the past, in response to a prescribed time period or a prescribed time of day, which the user can arbitrarily set.

As this invention may be embodied in several forms without departing from the spirit or essential characteristics thereof, the present embodiments are therefore illustrative and not restrictive, since the scope of the invention is defined by the appended claims rather than by the description preceding them, and all changes that fall within metes and bounds of the claims, or equivalents of such metes and bounds are therefore intended to be embraced by the claims.

What is claimed is:

1. A musical tune playback control apparatus comprising:
    a media processor for reading musical tune data recorded on a digital audio medium and for outputting them to a sound reproduction unit, which in turn produces corresponding musical tones;
    a storage device;
    a controller for checking the outputting of the musical tune data to the sound reproduction unit if said checked outputting satisfies a prescribed condition and for storing the musical tune data in the storage device;
    the controller being further adapted to read the musical tune data stored in the storage device and output said read the musical tune data to the sound reproduction unit in response to a playback instruction, wherein the prescribed condition is at least one of: (a) a playback time exceeds a prescribed duration, and (b) a number of the playback times exceeds a prescribed value; and wherein the prescribed condition is described in such a way that a time in which the media processor outputs the musical tune data to the sound reproduction unit exceeds a prescribed time and the prescribed condition is described in such a way that a number of times which the media processor repeatedly outputs the musical tune data to the sound reproduction unit exceeds a prescribed number of times.

2. A musical tune playback control apparatus according to claim 1, wherein the prescribed condition is arbitrarily set by a user.

3. A musical tune playback control apparatus according to claim 1, wherein the controller controls a display to display information regarding the musical tune data stored in the storage device on a screen.

4. A musical tune playback control apparatus according to claim 3, wherein a musical tune collection containing at least one musical tune data stored in the storage device is displayed on the screen of the display.

5. A musical tune playback control apparatus according to claim 3, wherein an album collection containing at least one album whose musical tune data are stored in the storage device is displayed on the screen of the display.

6. A musical tune playback control apparatus according to claim 3, wherein the controller stores the musical tune data in the storage device together with playback history data representing at least one of a time and a number of times in that the media processor outputs the musical tune data to the sound reproduction unit, and wherein the information regarding the musical tune data stored in the storage device is displayed on the screen of the display in response the playback history data.

7. A musical tune playback control apparatus according to claim 3, wherein the controller stores the musical tune data in the storage together with playback history data representing at least one of a time and a number of times in that the media processor outputs the musical tune data to the sound reproduction unit, and wherein the information regarding the musical tune data stored in the storage device is displayed on the screen of the display in such a way that a plurality of musical tune data are rearranged in order in response to the playback history data thereof.

8. A musical tune playback control apparatus according to claim 3, wherein index data are assigned to a plurality of musical tune data recorded on the digital audio medium, so that at least one of the plurality of musical tune data satisfying the prescribed condition are stored in the storage device, and wherein un-stored musical tune data within the plurality of musical tune data are displayed differently on the screen of the display compared with the musical tune data stored in the storage device.

9. The musical tune playback control apparatus according to claim 8, wherein the musical tune data stored in the storage device are displayed using specific characters while the un-stored musical tune data are displayed using different characters on the screen of the display.

10. The musical tune playback control apparatus according to claim 1, wherein the controller transfers musical tune data from the digital audio medium to the storage device, so that the musical tune data are stored in the storage device together with index data and an identifier specifying the digital audio medium, and wherein when un-stored musical tune data are designated from among a plurality of musical tune data recorded on the digital audio medium designated by the index data, the identifier of the digital audio medium is notified to a user.

11. A musical tune playback control apparatus comprising:
a media processor for reading musical tune data among a plurality of the musical tune data constructing an album recorded on a digital audio medium, so that the read musical tune data are supplied to a sound reproduction unit, thus producing musical tones;
a storage device;
a controller for checking a number of musical tune data output to the sound reproduction unit and for storing a content of the album in the storage device if the number of musical tune data exceeds a prescribed number and if a further prescribed condition is satisfied, namely at least one of: (a) a playback time exceeds a prescribed duration, and (b) a number of playback times exceeds a prescribed value;
wherein the prescribed condition is described in such a way that a time in which the media processor outputs the musical tune data to the sound reproduction unit exceeds a prescribed time and the prescribed condition is described in such a way that a number of times which the media processor repeatedly outputs the musical tune data to the sound reproduction unit exceeds a prescribed number of times; and
the controller being further adapted to read any one of the plurality of musical tune data of the album from the storage device and to supply the read musical tune data to the sound reproduction unit upon receipt of a playback instruction.

12. A musical tune playback control apparatus according to claim 11, wherein the prescribed number is set by a user.

13. A musical tune playback control apparatus comprising:
a media processor for reading musical tune data among a plurality of musical tune data recorded on a digital audio medium, so that the read musical tune data are supplied to a sound reproduction unit, thus producing musical tones;
a storage device;
a controller for assessing playback history data representing an output timing of the musical tune data and for storing the musical tune data in the storage device if said playback history data satisfies a prescribed condition;
the controller being further adapted to read musical data from the storage device and supply the read musical datato the sound reproduction unit in response to a playback instruction, wherein the prescribed condition is at least one of: (a) a playback time exceeds a prescribed duration, and (b) a number of the playback times exceeds a prescribed value; and
wherein the prescribed condition is described in such a way that a time in which the media processor outputs the musical tune data to the sound reproduction unit exceeds a prescribed time and the prescribed condition is described in such a way that a number of times which the media processor repeatedly outputs the musical tune data to the sound reproduction unit exceeds a prescribed number of times.

14. A musical tune playback control apparatus according to claim 13, wherein the prescribed condition describes that the output timing of the musical tune data belongs to a time period, which is designated by a user.

15. A musical tune playback control apparatus according to any one of claims 1, 11, and 13, wherein the digital audio medium is a compact disk or a mini disk, and the storage device is a hard disk drive.

16. A musical tune playback control method applied to a computer that comprises a media processor and a storage device, comprising the steps of:
- controlling the media processor to read musical tune data from a digital audio medium, upon receipt of a read instruction, so that the read musical tune data are supplied to a sound reproduction unit, thus producing musical tones;
- monitoring the supplying of the musical tune data to the sound reproduction unit to ascertain a status of being output to the sound reproduction unit associated with said musical tune data;
- storing the musical tune data whose status of being output to the sound reproduction unit satisfies a prescribed condition in the storage device;
- upon receipt of a playback instruction, reading the musical tune data from the storage device, so that the read musical tune data are supplied to the sound reproduction unit, wherein the prescribed condition is at least one of: (a) a playback time exceeds a prescribed duration, and (b) a number of the playback times exceeds a prescribed value; and
- wherein the prescribed condition is described in such a way that a time in which the media processor outputs the musical tune data to the sound reproduction unit exceeds a prescribed time and the prescribed condition is described in such a way that a number of times which the media processor repeatedly outputs the musical tune data to the sound reproduction unit exceeds a prescribed number of times.

17. A musical tune playback control method applied to a computer that comprises a media processor and a storage device, comprising the steps of:
- controlling the media processor to read musical tune data among a plurality of musical tune data constructing an album recorded on a digital audio medium, upon receipt of a read instruction, so that the read musical tune data are supplied to a sound reproduction unit, thus producing musical tones;
- monitoring the number of the musical tune data output to the sound reproduction storing a content of the album in the storage device if the monitored number of the musical tune data exceeds a prescribed number that is set in advance in the storage device and if a further prescribed condition is satisfied, namely at least one of: (a) the playback time exceeds a prescribed duration, and (b) the number of playback times exceeds a prescribed value;
- wherein the prescribed condition is described in such a way that a time in which the media processor outputs the musical tune data to the sound reproduction unit exceeds a prescribed time and the prescribed condition is described in such a way that a number of times which the media processor repeatedly outputs the musical tune data to the sound reproduction unit exceeds a prescribed number of times; and
- upon receipt of a playback instruction, reading the musical tune data from the storage device, so that the read musical tune data are supplied to the sound reproduction unit.

18. A musical tune playback control method applied to a computer that comprises a media processor and a storage device, comprising the steps of:
- controlling the media processor to read musical tune data from the digital audio medium, upon receipt of a read instruction, so that the read musical tune data are supplied to a sound reproduction unit, thus producing musical tones;
- monitoring the supplying of musical tune data to the sound reproduction unit to develop playback history data representing the output timing of the musical tune data output to the sound reproduction unit;
- storing the musical tune data in the storage device together with the playback history data;
- upon receipt of a playback instruction, reading the musical tune data whose playback history data satisfy a prescribed condition from the storage device, so that the read musical tune data are supplied to the sound reproduction unit, wherein the prescribed condition is at least one of: (a) a playback time exceeds a prescribed duration, and (b) a number of the playback times exceeds a prescribed value; and
- wherein the prescribed condition is described in such a way that a time in which the media processor outputs the musical tune data to the sound reproduction unit exceeds a prescribed time and the prescribed condition is described in such a way that a number of times which the media processor repeatedly outputs the musical tune data to the sound reproduction unit exceeds a prescribed number of times.

19. A musical tune playback control method according to any one of claims 16 to 18, wherein the digital audio medium is a compact disk or a mini disk, and the storage device is a hard disk drive.

20. A computer-readable storage medium encoded with a computer-executable program for implementing the musical tune playback control method as defined in any one of claims 16 to 18.

* * * * *

UNITED STATES PATENT AND TRADEMARK OFFICE
CERTIFICATE OF CORRECTION

PATENT NO. : 7,421,434 B2
APPLICATION NO. : 10/385394
DATED : September 2, 2008
INVENTOR(S) : Yuji Fujiwara It is certified that error appears in the above-identified patent and that said Letters Patent is hereby corrected as shown below:

Title Page, Inventor Information: item (75);
"Hamamatsu" should be --Hamamatsu-shi--
Column 21, Line 12, Claim 2:
"A" should be --The--
Column 21, Line 15, Claim 3:
"A" should be --The--
Column 21, Line 19, Claim 4:
"A" should be --The--
Column 21, Line 24, Claim 5:
"A" should be --The--
Column 21, Line 28, Claim 6:
"A" should be --The--
Column 21, Line 36, Claim 7:
"A" should be --The--
Column 21, Line 47, Claim 8:
"A" should be --The--
Column 22, Line 32, Claim 12:
"A" should be --The--
Column 22, Line 60, Claim 14:
"A" should be --The--
Column 22, Line 64, Claim 15:
"A" should be --The--
Column 24, Line 40, Claim 19:
"A" should be --The--

Signed and Sealed this

Twenty-third Day of December, 2008

JON W. DUDAS
*Director of the United States Patent and Trademark Office*